United States Patent
Bates

(10) Patent No.: US 12,288,103 B1
(45) Date of Patent: Apr. 29, 2025

(54) SYSTEMS AND METHODS TO FACILITATE ADAPTIVE RESOURCE CAPACITY PREDICTION AND CONTROL USING CLOUD INFRASTRUCTURES WITH A CAPACITY PREDICTION INTERFACE

(71) Applicant: THE HUNTINGTON NATIONAL BANK, Columbus, OH (US)

(72) Inventor: Matthew Bates, Columbus, OH (US)

(73) Assignee: THE HUNTINGTON NATIONAL BANK, Columbus, OH (US)

( * ) Notice: Subject to any disclaimer, the term of this patent is extended or adjusted under 35 U.S.C. 154(b) by 0 days.

(21) Appl. No.: 18/785,993

(22) Filed: Jul. 26, 2024

(51) Int. Cl.
*G06F 9/50* (2006.01)

(52) U.S. Cl.
CPC ............ *G06F 9/505* (2013.01); *G06F 9/5072* (2013.01)

(58) Field of Classification Search
CPC ...................................................... G06F 9/505
See application file for complete search history.

(56) References Cited

U.S. PATENT DOCUMENTS

| | | | |
|---|---|---|---|
| 9,043,798 B2 | 5/2015 | Calcaterra et al. | |
| 9,098,364 B2 | 8/2015 | Davis | |
| 9,442,983 B2 | 9/2016 | Higginson et al. | |
| 9,747,311 B2 | 8/2017 | Buehne et al. | |
| 9,762,461 B2 | 9/2017 | Raghunathan et al. | |
| 9,792,321 B2 | 10/2017 | Buehne et al. | |
| 9,996,562 B2 | 6/2018 | Higginson et al. | |
| 10,198,235 B2 | 2/2019 | Yoshizumi et al. | |
| 10,776,244 B2 | 9/2020 | Davis et al. | |
| 11,036,696 B2 | 6/2021 | Higginson et al. | |
| 11,157,664 B2 | 10/2021 | Higginson et al. | |
| 11,253,671 B2 | 2/2022 | Buchberger | |
| 11,256,671 B2 | 2/2022 | Buehne et al. | |
| 11,297,622 B1 | 4/2022 | Moore et al. | |
| 11,750,693 B1 * | 9/2023 | Wilfert | H04L 67/12 709/223 |
| 11,822,526 B2 | 11/2023 | Buehne et al. | |
| 2008/0172673 A1 | 7/2008 | Naik et al. | |

(Continued)

OTHER PUBLICATIONS

U.S. Appl. No. 18/785,954, "Notice of Allowance", Dec. 10, 2024, 21 pages.

*Primary Examiner* — Charlie Sun
(74) *Attorney, Agent, or Firm* — Kilpatrick Townsend & Stockton LLP

(57) ABSTRACT

Systems, methods, and non-transitory, machine-readable media may facilitate adaptive resource capacity prediction and control using cloud infrastructures with a capacity prediction interface. Specifications of resource allocations for resources provided by a cloud infrastructure system may be collected. Observation data may be collected and may include resource metrics data. Prediction rules may be selected as a function of particular resource metrics. A subset of the resources may be identified. The selected prediction rules may be used to predict resource capacities for the subset of the resources as a function of the particular resource metrics and generate resource capacity predictions. Incidents may be identified based on the resource capacity predictions. A capacity prediction interface may be generated and may be configured to represent the resource capacity predictions and facilitate preemptive actions with respect to the incidents identified based on the resource capacity predictions.

20 Claims, 17 Drawing Sheets

(56) References Cited

U.S. PATENT DOCUMENTS

| | | |
|---|---|---|
| 2009/0094355 A1 | 4/2009 | Johnson et al. |
| 2015/0019195 A1 | 1/2015 | Davis |
| 2015/0019197 A1 | 1/2015 | Higginson et al. |
| 2015/0019488 A1 | 1/2015 | Higginson et al. |
| 2015/0019564 A1 | 1/2015 | Higginson et al. |
| 2015/0019706 A1 | 1/2015 | Raghunathan et al. |
| 2015/0019707 A1 | 1/2015 | Raghunathan et al. |
| 2015/0020059 A1 | 1/2015 | Davis |
| 2015/0244645 A1 | 8/2015 | Lindo et al. |
| 2017/0153918 A1 | 6/2017 | Guo et al. |
| 2017/0351716 A1 | 12/2017 | Higginson et al. |
| 2018/0217800 A1 | 8/2018 | Yoshizumi et al. |
| 2018/0349797 A1 | 12/2018 | Garvey et al. |
| 2019/0114210 A1 | 4/2019 | Han et al. |
| 2019/0236439 A1 | 8/2019 | D et al. |
| 2021/0081379 A1 | 3/2021 | Buehne et al. |
| 2022/0014963 A1 | 1/2022 | Yeh et al. |
| 2022/0138166 A1 | 5/2022 | Buehne et al. |
| 2022/0385542 A1 | 12/2022 | Gokan Khan et al. |
| 2022/0398189 A1 | 12/2022 | Jansen et al. |
| 2023/0185472 A1 | 6/2023 | Higginson et al. |
| 2023/0206329 A1 | 6/2023 | Cella et al. |
| 2023/0214925 A1 | 7/2023 | Cella et al. |
| 2024/0012667 A1 | 1/2024 | Mohanty et al. |
| 2024/0220135 A1 | 7/2024 | Lifshitz et al. |
| 2024/0231920 A1 | 7/2024 | Jiang et al. |
| 2024/0356861 A1 | 10/2024 | Sathasivan et al. |

\* cited by examiner

SYSTEMS AND METHODS TO FACILITATE ADAPTIVE RESOURCE CAPACITY PREDICTION AND CONTROL USING CLOUD INFRASTRUCTURES WITH A CAPACITY PREDICTION INTERFACE

TECHNICAL FIELD

This disclosure generally relates to resources and cloud infrastructures, and more particularly to systems and methods to facilitate adaptive resource capacity prediction and control using cloud infrastructures with a capacity prediction interface.

BACKGROUND

Capacity control is an essential activity in the daily and prospective running of any multi-server computer system. For example, among other things, it is important to track central processing unit (CPU), memory and storage metrics for servers, types of hosts, applications, mappings of applications to servers, databases, etc. that comprise the infrastructure for a particular entity. For large-scale infrastructure, this may involve hundreds of tables or more of data that change on a daily basis. Keeping up with such changing data, identifying issues, performing analytics, making infrastructure adjustments, and/or the like may be extremely difficult to do effectively do with large-scale infrastructure in a timely manner. For example, inaccuracies and inefficiencies may result from manual building of spreadsheets that are cumbersome and fail to avoid errors in calculations, that are complicated such that only architects can understand, that involve low automation and require days/weeks to complete, that require interrogating repositories, etc. Such problems may affect infrastructure performance and the ability to adapt to changing capacity needs.

Thus, there is a need for systems and methods that address complexities, increase efficiencies, decrease errors, increase speeds, and otherwise improve capacity control and performance. These and other needs are addressed by the present disclosure.

BRIEF SUMMARY

Certain embodiments according to the present disclosure relate generally resources and cloud infrastructures, and more particularly to systems and methods to facilitate adaptive resource capacity prediction and control using cloud infrastructures with a capacity prediction interface.

In one aspect, a system may facilitate adaptive resource capacity prediction and control using cloud infrastructures with a capacity prediction interface. The system may include one or more processing devices and memory communicatively coupled with and readable by the one or more processing devices. The memory may include processor-readable instructions which, when executed by the one or more processing devices, cause the system to perform one or a combination of the following operations. Specifications of resource allocations for a plurality of resources provided by a cloud infrastructure system may be collected. Based at least in part on the specifications of the resource allocations, observation data may be collected. The observation data may include the resource metrics data mapped to the plurality of resources. Prediction rules may be selected from a plurality of prediction rules as a function of one or more particular resource metrics. A subset of the plurality of resources may be identified based at least in part on the observation data. The selected prediction rules may be used to predict resource capacities for the subset of the plurality of resources as a function of the one or more particular resource metrics and generate resource capacity predictions. One or more incidents may be identified based at least in part on the resource capacity predictions. A subset of the resource capacity predictions may be selected based at least in part on determining which of the resource capacity predictions satisfy one or more prediction thresholds. A capacity prediction interface may be generated. The capacity prediction interface may be configured to represent at least the subset of the resource capacity predictions and facilitate one or more preemptive actions with respect to the one or more incidents identified based at least in part on the resource capacity predictions.

In another aspect, one or more non-transitory, machine-readable media having machine-readable instructions thereon which, when executed by one or more processing devices, may cause a system to perform one or a combination of the following operations. Specifications of resource allocations for a plurality of resources provided by a cloud infrastructure system may be collected. Based at least in part on the specifications of the resource allocations, observation data may be collected. The observation data may include the resource metrics data mapped to the plurality of resources. Prediction rules may be selected from a plurality of prediction rules as a function of one or more particular resource metrics. A subset of the plurality of resources may be identified based at least in part on the observation data. The selected prediction rules may be used to predict resource capacities for the subset of the plurality of resources as a function of the one or more particular resource metrics and generate resource capacity predictions. One or more incidents may be identified based at least in part on the resource capacity predictions. A subset of the resource capacity predictions may be selected based at least in part on determining which of the resource capacity predictions satisfy one or more prediction thresholds. A capacity prediction interface may be generated. The capacity prediction interface may be configured to represent at least the subset of the resource capacity predictions and facilitate one or more preemptive actions with respect to the one or more incidents identified based at least in part on the resource capacity predictions.

In yet another aspect, a method may facilitate adaptive resource capacity prediction and control using cloud infrastructures with a capacity prediction interface. The method may include one or a combination of the following. Specifications of resource allocations for a plurality of resources provided by a cloud infrastructure system may be collected. Based at least in part on the specifications of the resource allocations, observation data may be collected. The observation data may include the resource metrics data mapped to the plurality of resources. Prediction rules may be selected from a plurality of prediction rules as a function of one or more particular resource metrics. A subset of the plurality of resources may be identified based at least in part on the observation data. The selected prediction rules may be used to predict resource capacities for the subset of the plurality of resources as a function of the one or more particular resource metrics and generate resource capacity predictions. One or more incidents may be identified based at least in part on the resource capacity predictions. A subset of the resource capacity predictions may be selected based at least in part on determining which of the resource capacity predictions satisfy one or more prediction thresholds. A capacity prediction interface may be generated. The capacity prediction interface may be configured to represent at least the subset of the resource capacity predictions and facilitate one or more preemptive actions with respect to the one or more incidents identified based at least in part on the resource capacity predictions.

In various embodiments, the one or more prediction thresholds may be determined as a function of type of resource and/or type of metric. In various embodiments, the capacity prediction interface may include a capacity dashboard that graphically indicates which resource capacity predictions of the subset of the resource capacity predictions are predicted to reach exhaustion in an upcoming time window. In various embodiments, the capacity dashboard may include one or more user-selectable interface elements to reveal which resource capacity predictions of the subset of the resource capacity predictions are predicted to reach exhaustion in a second upcoming time window that is later than the upcoming time window. In various embodiments, the capacity dashboard may graphically indicate mappings of the subset of resource capacity predictions to hosts, applications, statuses, and indicia of issues as a function of various resource types. In various embodiments, the capacity dashboard may include one or more user-selectable interface elements to reveal the subset of the resource capacity predictions as a function of type of resource. In various embodiments, the capacity dashboard may include one or more user-selectable interface elements for each incident of the one or more incidents to reveal one or more visualizations particularized to the incident.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
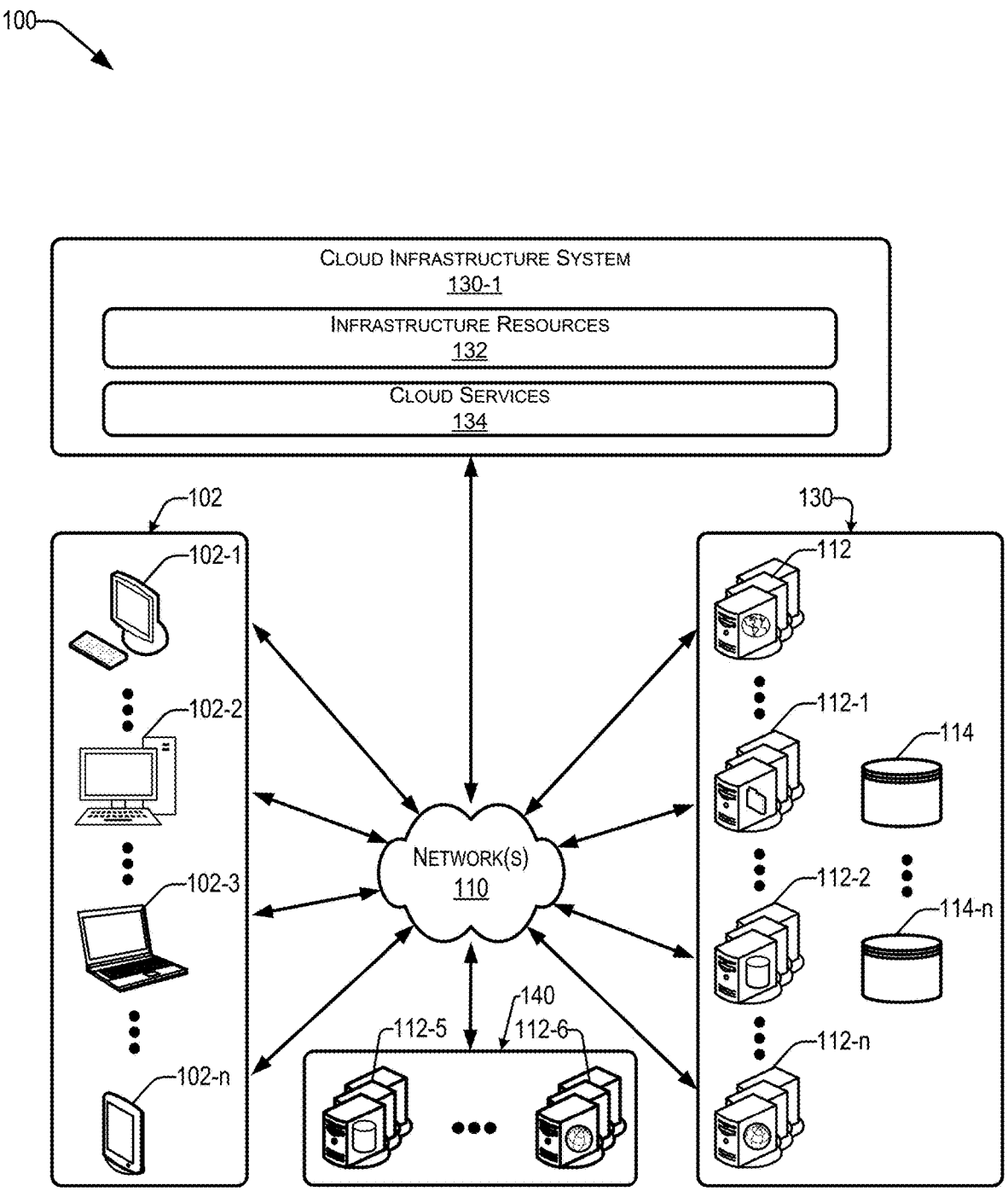
FIG. 1 illustrates computing infrastructure for implementing disclosed embodiments in accordance with present disclosure.

Various embodiments will now be disclosed in greater detail with reference to the accompanying figures, beginning with FIG. 1. FIG. 1 depicts a simplified diagram of computing infrastructure 100 for implementing disclosed embodiments in accordance with present disclosure. The selection and/or arrangement of components depicted in FIG. 1 are shown only by way of example and are not meant to be limiting. As in the illustrated embodiment, the computing infrastructure 100 may correspond to a system that includes one or more client computing devices 102, which may be configured to execute and operate a variety of applications, which may include, for example, a client application such as a web browser, proprietary client, or the like over one or more networks 110, which may include one or more internal networks and/or one or more external networks.

In some embodiments, the computing infrastructure 100 may include a server system 130, which may be on premises and/or remote from the client computing devices 102. The server system 130 may include one or more servers 112. The servers 112 may be communicatively coupled with the remote client computing devices 102 via the one or more networks 110. In various embodiments, the servers 112 may be adapted to run one or more services or software applications provided by one or more of the components of the computing infrastructure 100.

Software components may be implemented on one or more of the servers 112 and/or the client computing devices 102. Users operating the client computing devices 102 may utilize one or more client applications to use the services provided by components of the computing infrastructure 100. Various components of the computing infrastructure 100 may be implemented in hardware, firmware, software, or combinations thereof. It should be appreciated that various different system configurations are possible, which may be different from the example of the computing infrastructure 100. The embodiment shown in the figure is thus one example of a computing infrastructure 100 for implementing embodiments according to the present disclosure and is not intended to be limiting.

The client computing devices 102 may be portable handheld devices (e.g., a smartphone, a touchscreen tablet computer, a personal digital assistant or wearable devices), running software such as a variety of mobile operating systems such as iOS, Windows Phone, Android, and the like, and being Internet, e-mail, short message service (SMS), or other communication protocol enabled. Alternatively, or in addition, the client computing devices 102 may be general-purpose personal computers including, by way of example, personal computers and/or laptop computers running various operating systems. Alternatively, or in addition, the client computing devices 102 may be workstation computers running any of a variety of operating systems. Alternatively, or in addition, the client computing devices 102 may be any other electronic device, such as a thin-client computer, and/or a personal messaging device, capable of communicating over the network(s) 110. Although a number of the client computing devices 102 is illustrated, any number of client computing devices 102 may be supported.

The network(s) 110 may be any type of network or combination of types of networks familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 may be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks. Various components of the computing infrastructure 100 may include various network interfaces to facilitate communications between the client computing devices 102, one or more server systems 130, one or more remote systems 140, and/or a cloud infrastructure system 130-1. In some embodiments, some of the interfaces may include or otherwise correspond to API interfaces to transmit to and/or receive communications from one or a combination of the components of the computing infrastructure 100 using APIs.

Each server 112 may be composed of one or more general-purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, one or more servers 112 may be adapted to run one or more services or software applications described in the present disclosure. For example, one or more servers 112 may correspond to a server for performing processing described above according to an embodiment of the present disclosure.

Each server 112 may run an operating system, including any available server operating system. Each server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. In various embodiments, the servers 112 may include aggregation servers that share data with data storage servers via the one or more networks 110, which may include one or more internal networks. The data storage servers may be configured to store data and may include database servers, file storage servers, and other similar data storage servers. In various embodiments, the servers 112 may include interface servers that may provide one or more interfaces applications to interact with the other elements of the system 100. The interface servers may provide the one or more interfaces and communicate with the other elements of the system 100 via the one or more networks 110. The interfaces generated by the interface servers may be used by the client computing devices 102 to interact with elements of the system 100.

In some embodiments, one or more of the servers 112 may include one or more applications to analyze and consolidate resource data feeds and/or event resource updates received from one or more components of the system 100. For example, resource data feeds and/or resource event updates may include, but are not limited to, real-time resource data updates received from one or more third-party information sources and continuous data streams, which may include real-time resource events related to resource capacity measuring tools (e.g., resource monitoring and resource control applications) and/or the like. One or more of the servers 112 may also include one or more applications to display the resource data feeds and/or resource real-time events, and/or resource capacity prediction data and visualizations, via one or more display devices of the client computing devices 102.

The computing infrastructure 100 may also include one or more databases 114. The databases 114 may reside in a variety of locations. By way of example, one or more of the databases 114 may reside on a non-transitory, storage medium local to (and/or resident in) one or more servers 112. Additionally or alternatively, one or more databases 114 may be remote from the servers 112 and in communication with the servers 112 via network-based or dedicated connection. In various embodiments, one or more databases 114 may reside in a storage-area network (SAN), NAS (Network Attached Storage), or cloud storage capabilities, such as block, file, or object storage. Similarly, any necessary files for performing the functions attributed to the servers 112 may be stored locally on the servers 112 and/or remotely, as appropriate. In one set of embodiments, the databases 114 may include relational databases that are adapted to store, update, and retrieve data in response to SQL-formatted commands.

The computing infrastructure 100 may include a cloud infrastructure system 130-1 that may be configured to provide infrastructure resources 132 and cloud services 134 made available to the client computing devices 102 via the one or more networks 110, which may include the Internet. The cloud infrastructure system 130-1 may include a server system, such as the server system 130. Although illustrated separately, in some embodiments, the cloud infrastructure 130-1 may include the server system 130 and provide cloud services to the client computing devices 102. In some embodiments, the cloud infrastructure 130-1 may include a version of the server system 130 and provide cloud services to the client computing devices 102, while the client computing devices 102 may additionally use the resources of the server system 130 such that the server system 130 may be on premises or remote with respect to the client computing device is 102. Accordingly, in various embodiments, resources may be provided to the client computing devices 102 by on-premises server system, remote server system, and/or cloud services.

The cloud infrastructure system 130-1 may include infrastructure resources 132 for providing the resources used to provide various services to clients. In various embodiments, the cloud services 134 provided by the cloud infrastructure system 130-1 may include a host of services that are made available to the client computing devices 102 on demand, such as online data storage and backup solutions, hosted office suites and document collaboration services, database processing, technical support services, and the like. The cloud services 134 may include infrastructure services that facilitate the control of the underlying computing resources, such as storage, networks, and other fundamental computing resources for clients. The cloud-provisioned resources may include resources shared by multiple users and dynamically re-allocated per demand, and pre-integrated and optimized combinations of hardware, such as servers, storage, and networking resources to execute services.

In various embodiments, the cloud services may include one or more services of various types such as Infrastructure as a Service (IaaS), Database as a Service (DbaaS), Platform as a Service (PaaS), Software as a Service (SaaS), and/or other services including hybrid services. The underlying software and infrastructure for providing the clouds services may be controlled by the cloud infrastructure system 130-1. In some examples, a cloud service may include protected computer network access to remote storage on the cloud through the Internet, a hosted database, a hosted web server, a software application, database cloud services, middleware cloud services, and Java cloud services, and/or the like. For example, a cloud service may include a web-based service, a web service-based hosted, a script-language middleware engine for use by a networked developer, and/or the like.

In some implementations, the computing infrastructure 100 may also include one or more remote service provider systems 140 (also referenced herein as remote systems 140), each of which may be communicatively couplable with the client computing devices 102 via the networks 110. The remote systems 140 may provide services that provide resource data supporting capacity control features disclosed herein. In some implementations, the one or more remote systems 140 may be, include, or otherwise correspond to one or more resource-monitoring systems that may be configured to monitor resource capacities of other components of the infrastructure 100, such as the resources allocated to and used by the client computing devices 102 and/or the server system 130, store resource data corresponding to the resource capacities, and provide the resource data to a capacity prediction and control subsystem disclosed herein. For example, in some embodiments, the resource-monitoring system(s) may provide for monitoring of resource states, resource attributes, and/or other resource data for resources used by, and/or allocated to, the client computing devices 102, where the resources may be provided by the server system 130 and/or the cloud infrastructure system 130-1. The resource states, resource attributes, and/or other resource data may include, for example, resource metrics, resource capacities, resource usage, resource identifiers, resource descriptions and specifications, resource allocations and mappings, resource states, resource availabilities, and/or the like to facilitate various embodiments disclosed herein. In various embodiments, resource metrics may include, describe, specify, indicate, define, and/or otherwise correspond to one or a combination of any suitable resource metric, such as CPU utilization, total CPU processor time, CPU processor time per CPU, memory utilization, storage utilization, memory used, memory available, memory committed, page life expectancy, swap percent used, swap memory free megabytes, and/or the like with respect to a resource and/or a set of resources. In various embodiments, in addition or alternative, the resource-monitoring may be performed by the server system 130 and/or the cloud infrastructure system 130-1 such that one or a combination of the one or more remote systems 140, the server system 130, and/or the cloud infrastructure system 130-1 may perform the resource monitoring and may be resource-monitoring systems.

In various embodiments, the resource monitoring may be based at least in part on one or a combination of monitoring software installed on one or more servers of the server system 130 and/or the cloud infrastructure system 130-1, one or more APIs that define protocols and routines for interfacing with the resource data sources with calls to/from the resource data sources via an API interface, and/or the like. In various embodiments, Secure Shell (SSH), Telnet, Simple Network Management Protocol ("SNMP"), and/or any other suitable protocol may be used to facilitate communications between the resource-monitoring system(s) and other components of the infrastructure. By way of example, to gather resource data, the resource-monitoring system may run one or more scripts, select one or more servers, establish one or more communication pipes to the one or more servers, log into the one or more servers for command line access via a transport layer by, for example, IP address and any suitable protocol, and pull resource data from the one or more servers. Other embodiments are possible.

Figure 2:
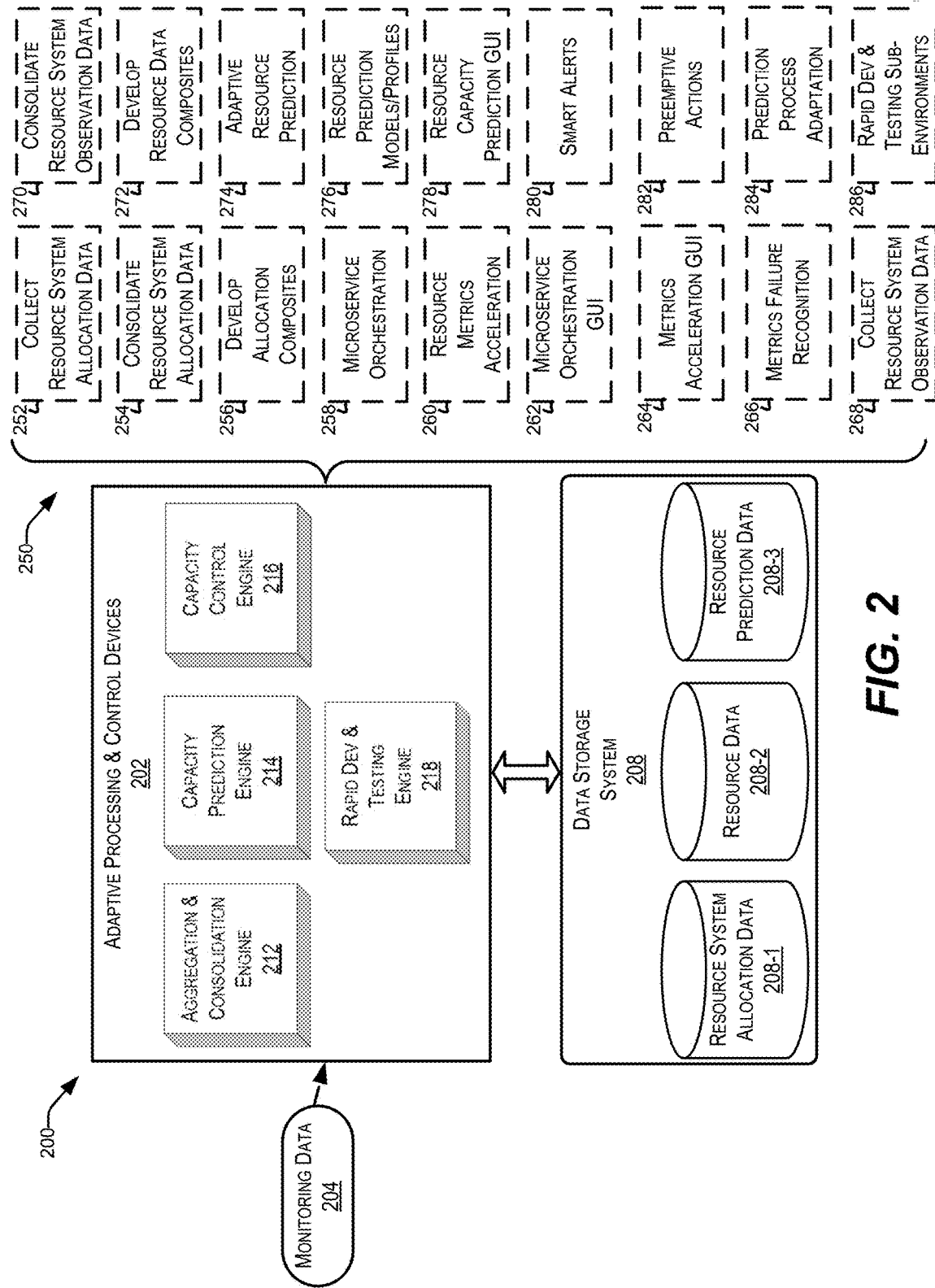
FIG. 2 illustrates a functional diagram for various embodiments of an adaptive resource capacity prediction and control subsystem, in accordance with the present disclosure, in accordance with disclosed embodiments according to the present disclosure.

FIG. 2 illustrates a functional diagram for various embodiments of an adaptive resource capacity prediction and control subsystem 200, in accordance with the present disclosure. In various embodiments, the subsystem 200 may include or otherwise be facilitated by one or a combination of the client computing devices 102, the server system 130, and/or the cloud infrastructure system 130-1. For example, the subsystem 200 may include a client computing device 102 using resources of the server system 130 and/or the cloud infrastructure system 130-1 to facilitate various features disclosed herein. While engines, repositories, and other components are described separately in this disclosure, it should be appreciated that the components may be combined and/or implemented differently in any combination to provide certain features in various embodiments with hardware, software and/or firmware. In various embodiments, different processes running on one or more shared resources may implement some of the components.

The subsystem 200 may be configured to provide a number of adaptive resource capacity prediction and control features 250. The subsystem 200 may include one or more adaptive resource capacity processing and control devices 202. The one or more devices 202 may include one or more aggregation and consolidation engines 212 (which may be referenced as "consolidation engine 212" herein), one or more capacity prediction engines 214, and/or one or more capacity control engines 216, which may be separate or integrated in various embodiments. While the engines are shown separately, it should be appreciated that in various embodiments the engines may be combined or broken down further according to various features provided in various embodiments. The engines may be stored in memory and may include executable code and/or one or more software applications specially configured to provide the features disclosed herein, executable with one or more processors of the client computing devices 102, the server system 130, and/or the cloud infrastructure system 130-1 to provide the features disclosed herein. In various embodiments, the one or more devices 202 may correspond to one or a combination of the client computing devices 102, the server system 130, and/or the cloud infrastructure system 130-1 with a single, integral engine or separate engines working in conjunction. In some embodiments, the consolidation engine 212 may correspond to a consolidation server, the capacity prediction engine 214 may correspond to a capacity prediction server, and/or the capacity control engine 216 may correspond to a capacity control server. The engines may be configured to perform any of the steps of methods described in the present disclosure.

The one or more adaptive resource capacity processing and control devices 202 may be communicatively coupled with interface components and communication channels (which may take various forms in various embodiments as disclosed herein) configured to receive resource monitoring data 204. In some embodiments, the resource monitoring data 204 may include input from a plurality of different data sources. With respect to some adaptive resource capacity prediction and control features 250, the consolidation engine 212 may be configured to collect resource system allocation data 252, perform consolidation of the resource allocation data 254, and develop allocation composites 256. The adaptive resource capacity prediction and control features 250 may further include microservice orchestration 258, resource metrics acceleration 260, collecting resource system observation data 268, consolidating resource system observation data 270, and developing resource data composites 272. In some embodiments, the consolidation engine 212 may be configured to provide or otherwise facilitate such features 250.

The consolidation engine 212, with the one or more processors, may, for example, be configured to collect the resource monitoring data 204 from the one or more data sources. In various embodiments, the resource monitoring data 204 from the one or more data sources may be retrieved and/or received by the one or more devices 202 via one or more data acquisition interfaces, which may include interfaces of the client computing devices 102, the server system 130, the cloud infrastructure system 130-1, and/or the like through network(s) 110 through any suitable means for transferring data. According to disclosed embodiments, data pulled and/or pushed from the one or more data sources may be transformed, and the transformed data and/or other data generated based thereon may be made available by the one or more devices 202.

In some embodiments, the subsystem 200 may use automated collectors/agents (e.g., extraction, transformation, and loading (ETL)) to collect key metrics and securely transport data. In some embodiments, the one or more data acquisition interfaces may include one or more APIs that define protocols and routines for interfacing with the data sources. The APIs may specify API calls to/from data source components and/or systems. In some embodiments, the APIs may include a plug-in to integrate with an application of a data components and/or systems. The one or more data acquisition interfaces, in some embodiments, could use a number of API translation profiles configured to allow interface with the one or more additional applications of the data sources to access data (e.g., a database or other data store) of the data sources. The API translation profiles may translate the protocols and routines of the data source component and/or system to integrate at least temporarily with the system and allow communication with the system (one-way communication to the system and/or two-way communication with system in various embodiments) by way of API calls. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

The consolidation engine 212 may be configured to collect the resource monitoring data 204 from the one or more data sources, combine the data into a repository, use rules to clean, consolidate, and curate the data, heal errors and gaps in the data, ensure data integrity, and otherwise prepare the data for storage, data analytics, machine learning, and/or resource capacity prediction to facilitate improvements with adaptive resource capacity prediction and control features 250 disclosed herein. As disclosed herein, embodiments according to the present disclosure provide technological solutions to multiple problems existing with conventional systems and approaches. Conventional systems and approaches are deficient in efficiency, accuracy, timeliness, and adaptability in resource capacity prediction and control. Accordingly, the technical improvements provided by the subsystem 200 over prior technologies include improvements in efficiency, accuracy, timeliness, and adaptability in resource capacity prediction and control. Such improvements may be based at least in part on machine-intelligent handling of input from multiple different sources, including the server system 130, one or more remote service provider systems 140, and/or the cloud infrastructure system 130-1 in order to adapt to various particular changes in resource attributes, capacities, demands, availabilities, changes, upgrades, downgrades, and/or the like, as is disclosed further herein.

Further, the adaptive resource capacity prediction and control features 250 may include facilitating a microservice orchestration graphical user interface 262, which may include a metrics acceleration graphical user interface 264 and metrics failure recognition 266 features. In various embodiments, the consolidation engine 212, the capacity prediction engine 214, and/or the capacity control engine 216 may be configured to provide or otherwise facilitate the microservice orchestration graphical user interface 262, the metrics acceleration graphical user interface 264, and the metrics failure recognition 266.

Some of the operations of the microservice orchestration 258, the resource metrics acceleration 260, and/or the collecting resource system observation data 268 may be performed using microservices. A microservice may be an independent cloud service provided by the cloud infrastructure system 130-1 and may be included, for example, in the cloud services 134. A microservice in the cloud may not require a particular host and particular hardware and may be communicated via one or more lightweight protocols. A microservice may be small in size with limited execution times. For example, the running of a microservice may be limited to 15 minutes or less. In some embodiments, all of the operations of the microservice orchestration 258 and the resource metrics acceleration 260 may be limited to 15 minutes or less.

To facilitate the microservice orchestration 258, the resource metrics acceleration 260, and/or the collecting resource system observation data 268, the subsystem 200 may use a microservice orchestration function builder. The microservice orchestration function builder may use one microservice orchestration function to call one or more additional microservice functions. In some embodiments, the microservice orchestration function builder may be executed automatically. In some embodiments, the aggregation and consolidation engine 212 may include, or may otherwise be configured to provide, and may initiate the microservice orchestration function builder. The initiation of the microservice orchestration function builder may include transmitting a service request to the cloud infrastructure system 130-1. In some embodiments, the aggregation and consolidation engine 212 may configure the microservice orchestration function builder to be executed by the cloud infrastructure system 130-1 on a repeating basis, for example, on a periodic basis (e.g., monthly, weekly, daily, hourly, etc.).

The microservice orchestration graphical user interface 262 may be a customized interface that may represent at least part of the microservice orchestration 258, the resource metrics acceleration 260, and the collecting resource system observation data 268. The microservice orchestration graphical user interface 262 may can be exposed to one or more of the client computing devices 102 to show the progression and the statuses of various process steps of the microservice orchestration 258, the resource metrics acceleration 260, and the collecting resource system observation data 268.

Based at least in part on the resource system observation data, resource metrics, and/or other resource data, the subsystem 200 (e.g., using the consolidation engine 212) may create and/or develop the resource data composites 272 to include the resource data curated and cleaned for use in resource capacity prediction features disclosed herein. Resource data composites 272 may be stored in a resource data repository 208-2 of the data storage system 208. In some embodiments, this may include curating and appending resource data composites 272, which may include daily level metrics, on a daily basis to the curated resource data set, to build and develop the data set over time of resource data composites 272 for use in ongoing trending and predictions.

Using the resource data composites 272, the subsystem 200 (e.g., using the capacity prediction engine 214) may perform adaptive resource capacity prediction 274. For example, the subsystem 200 (e.g., using the capacity prediction engine 214) may use data from the resource data composites 272 to model each resource, which models may correspond to resource prediction profiles 276, and store the models as resource prediction profiles 276 in a resource data repository 208-2 of a data storage system 208. In various embodiments, the data storage system 208 may include one or a combination of one or more data storage servers and/or one or more databases that may reside in one or more locations. By way of example, the data storage system 208 may include one or more of the databases 114 or other databases like databases 114 that may be at least partially remote from the client computing devices 102 and/or may be at least partially local to the client computing devices 102, and/or may reside in the cloud infrastructure system 130-1. The resource capacity prediction engine 214 may include logic to implement and/or otherwise facilitate any taxonomy, classification, categorization, correlation, mapping, data analytics, machine learning, qualification, scoring, organization, and/or the like to facilitate resource capacity prediction features disclosed herein. In various embodiments, the resource capacity prediction engine 214 may employ one or more artificial intelligence (machine learning or, more specifically, deep learning) algorithms to perform pattern matching to detect patterns of resource metrics of the resources.

Each resource prediction profile 276 may include or be a corresponding resource capacity prediction model to facilitate visualization of the respective resource capacity prediction with a resource capacity prediction graphical user interface (GUI) 278, for example, with a capacity dashboard provided by the subsystem 200 (e.g., facilitated by the capacity control engine 216). Using resource allocation composites 256 and corresponding resource prediction profiles 276, the subsystem 200 (e.g., the resource capacity prediction engine 214 and/or the capacity control engine 216) may create visualizations of capacity predictions for particular resources and/or resource types, which may be exposed via one or more interfaces of the capacity dashboard. The remote resource capacity prediction interface 278 may provide for the capacity dashboard that allows for control of resources for an entity, where the resource may be remotely located from the client computing devices 102 and/or may be distributed in multiple locations, with some embodiments allowing for making remote changes to resource configurations to preemptively accommodate predicted resource demands.

Figure 3A:
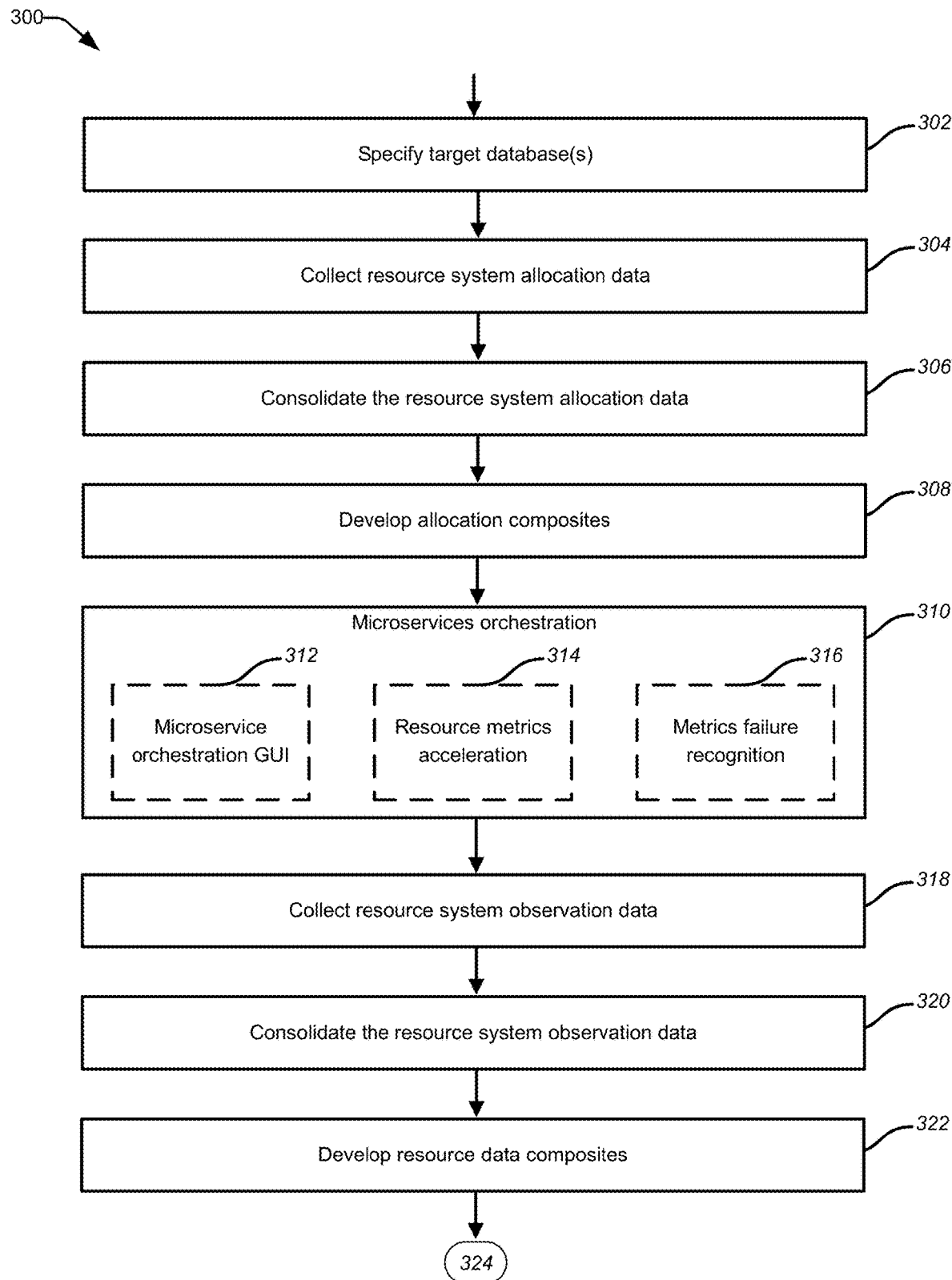
FIGS. 3A and 3B depict an example method to facilitate adaptive resource capacity prediction and control, in accordance with disclosed embodiments according to the present disclosure.
Figure 3B:
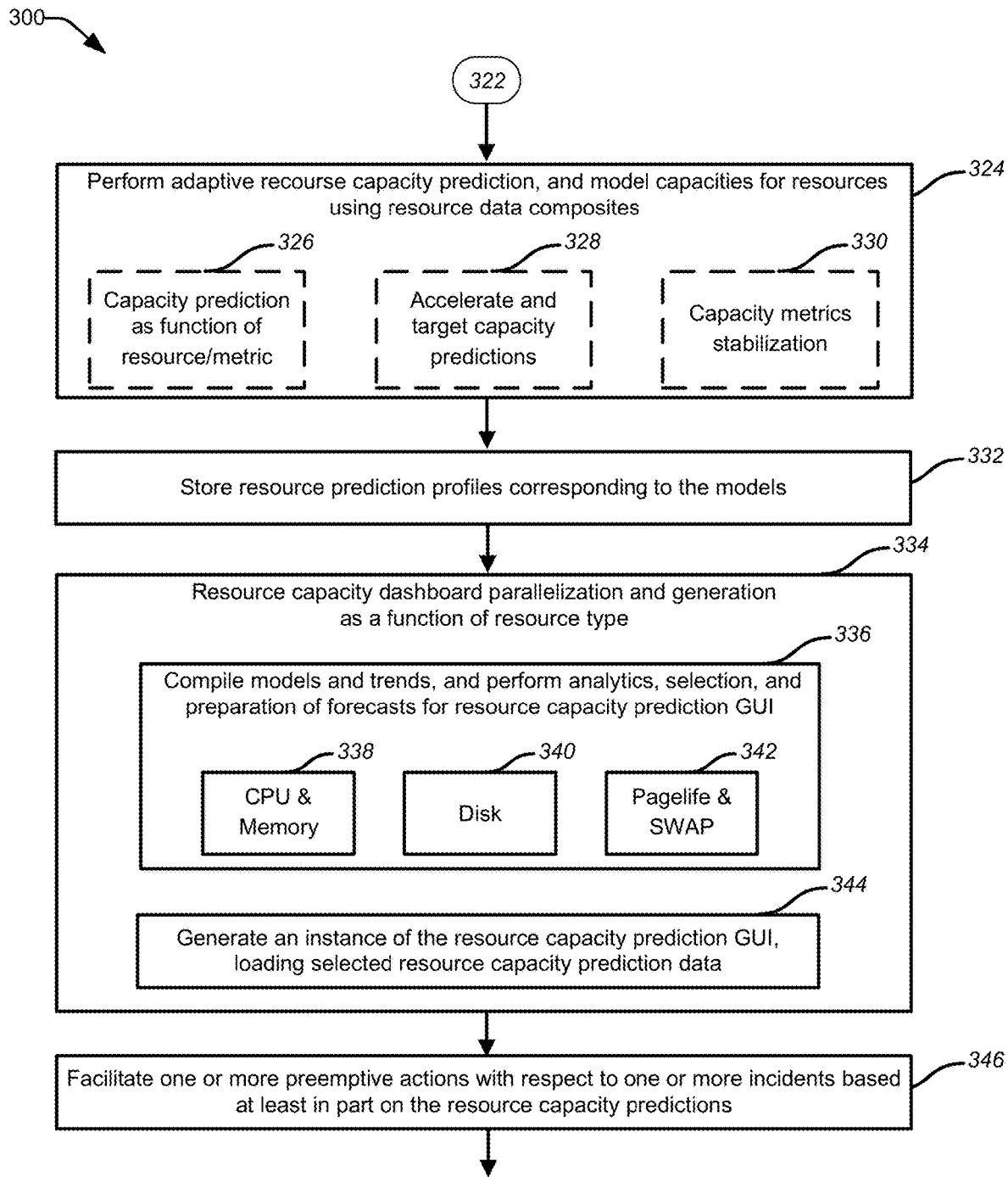

By way of example of the adaptive resource capacity prediction and control features 250, FIGS. 3A and 3B depict an example method 300 to facilitate adaptive resource capacity prediction and control, in accordance with embodiments according to the present disclosure. However, teachings of the present disclosure may be implemented in a variety of configurations. As such, the order of the steps comprising the method 300 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously. Additionally, in some embodiments, the method 300 may be a portion of a graphical user interface (e.g., resource capacity prediction graphical user interface 278) that can be exposed to one or more of the client computing devices 102 to show the progression and the statuses of various process steps indicated by the method 300.

In various embodiments, the features or a subset of the features of the method 300 may be automatically executed by the subsystem 200 in response to the subsystem 200 detecting a defined event. In various embodiments, the defined event may correspond to a defined time/date that may be repeated on a periodic basis (e.g., monthly, weekly, daily, hourly, etc.). In various embodiments, the defined event may correspond to a device interaction or data change caused with respect to at least one client computing device 102, at least one remote system 130, and/or the cloud infrastructure system 130-1 that may include, specify, indicate, define, and/or otherwise correspond to one or more factors affecting resource capacities of resources controlled by the resource-controlling systems; states of the resource-controlling systems; states, values, and metrics of resources controlled and/or otherwise used by the resource-controlling systems; and/or the like. In various embodiments, the subsystem 200 may change the defined event in response to determining that previously generated resource capacity predictions, generated as disclosed further herein, satisfy one or more thresholds (e.g., when a resource capacity prediction indicates that one or more resources and/or resource types exceed one or more criticality thresholds, the defined event may be changed from one temporal basis to another more frequent temporal basis).

As indicated by block 302, a target database may be specified. In some embodiments, the database may be specified by a database setting that was previously specified (e.g., the database used last time the process was performed may be the default target database). The database setting may include a pointer to which database will be used with one or more of the subsequent process steps. In various embodiments, the target database may be changed by user input or automatically when changed for testing purposes to a different database such that the one or more subsequent process steps may be tested with respect to the different database. In various embodiments, the target database may be part of the data storage system 208 of FIG. 2.

In some embodiments, as indicated by block 304, resource system allocation data may be collected. This may correspond to collecting specifications of resource allocations for a plurality of resources provided by the cloud infrastructure system 130-1 and/or the server system 130. For example, allocation profile data may be pulled from a configuration control database 114 and/or one or more remote systems 140. The allocation profile data may include mappings of application-to-server relationships and allocations of CPU, memory, storage, and/or the like profile data. In some embodiments, allocation profile data may be a per-server basis and may, for example, include specifications of server type; operating system of the server; how much CPU, memory, and storage is allocated to that particular server; which applications the server supports; and/or the like. In some embodiments, the configuration control database 114 may be provided by a remote system 140, which may be called to pull the allocation profile data.

As indicated by block 306, the resource system allocation data may be consolidated, and, as indicated by block 308, allocation composites 256 may be developed. This may include consolidating allocation data corresponding to the specifications of the resource allocations and using the allocation data to develop allocation composites, where the allocation composites may include mappings of hosts, resource types, resource specifications, and/or the like. For example, a subset of the allocation profile data may be extracted as a function of one or more data changes. In some embodiments, the subset of allocation profile data may be expanded to update a time-based data structure of capacity data as a function of the one or more data changes. For example, a mapping of host identifier; host type; CPU type, specifications and/or metrics; memory type, specifications and/or metrics; storage type, specifications and/or metrics; date/time values; and/or the like may be extracted or generated from the allocation profile data only when a data change with respect to the subset of data has been detected (e.g., by way of detecting a change bit, a change flag, or a checksum). Accordingly, redundant extraction and/or generation operations may be eliminated for static data. When the mapping is determined to correspond to static data for multiple dates/times, the mapping may be propagated in the time-based data structure using a vector of the static data in order to forward fill the data and represent the static data according to the time scale (e.g., daily). In some embodiments, a plurality of mappings may be extracted or generated, one for each unique subset of host identifier; host type; CPU type, specifications and/or metrics; memory type, specifications and/or metrics; storage type, specifications and/or metrics; date/time values; and/or the like. In some embodiments, each mapping may correspond to an allocation composite of the host identifier, CPU specifications and metrics, memory specifications and metrics, storage specifications and metrics and date/time values, and/or the like. The allocation composites 256 may be stored in a resource system allocation data repository 208-1 of the data storage system 208, illustrated in FIG. 2.

Referring again to FIG. 3A, as indicated by block 310, microservice orchestration may be performed. The microservice orchestration may include orchestrate and causing execution of a series of sets of parallel microservices. Each set of parallel microservices may be a function of a particular type of resource data and facilitates obtaining resource system observation data that may include resource metrics data corresponding to the particular type of resource data. The series of sets of parallel microservices may facilitate obtaining resource metrics data mapped to the plurality of resources provided by the cloud infrastructure system 130-1 and/or the server system 130. In some embodiments, the microservice orchestration may be based at least in part on the allocation composites 256. The microservice orchestration may include facilitating a microservice orchestration graphical user interface as indicated by block 312, resource metrics acceleration as indicated by block 314, and metrics failure recognition as indicated by block 316.

Figure 4A:
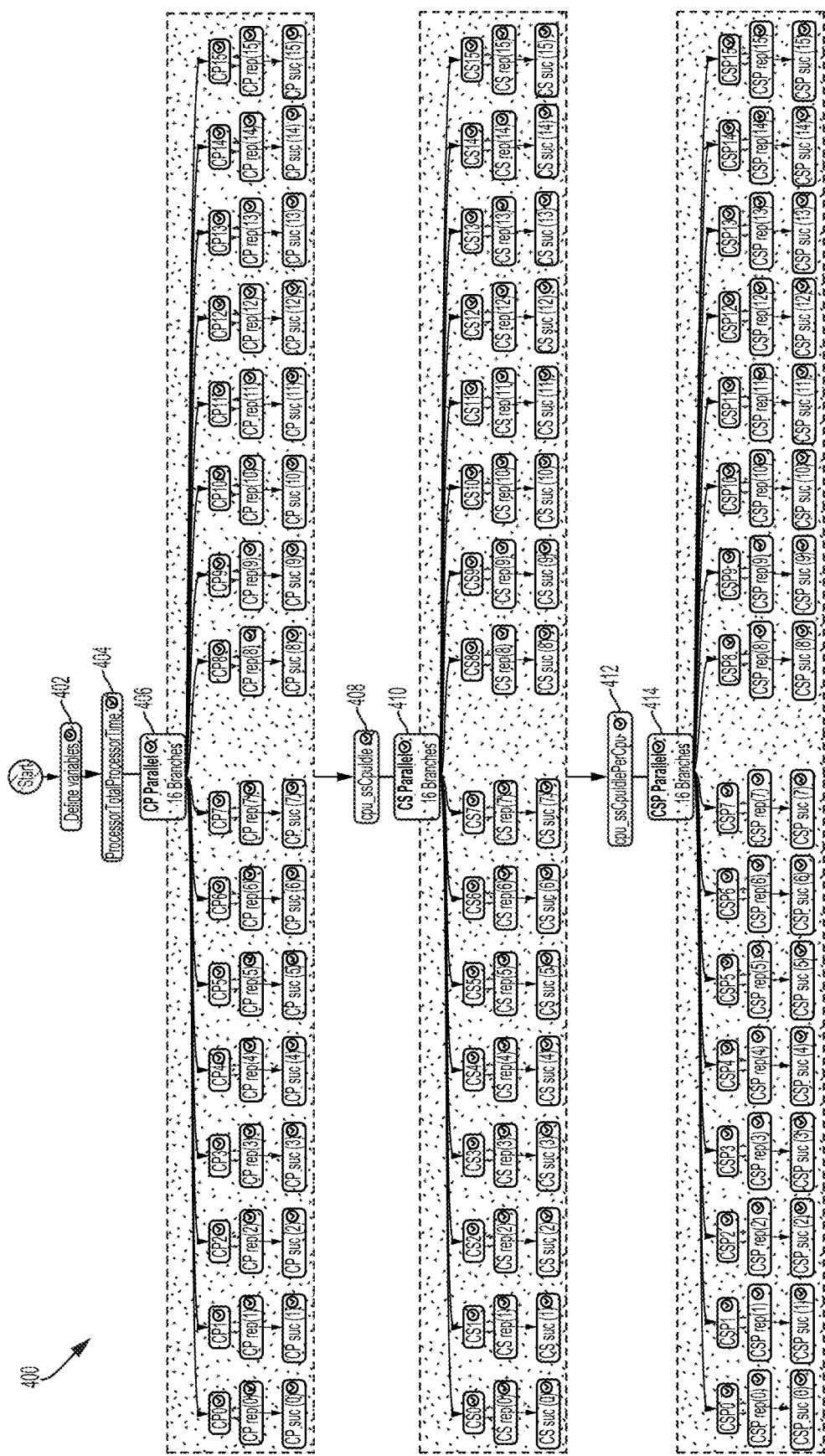
FIGS. 4A and 4B depict portions of an example graphical user interface representing parts of the microservice orchestration, the resource metrics acceleration, and the collecting resource system observation data, in accordance with disclosed embodiments according to the present disclosure.

FIG. 4A depicts a portion of an example graphical user interface 400 representing part of the microservice orchestration, the resource metrics acceleration, and the collecting resource system observation data, in accordance with embodiments according to the present disclosure. The graphical user interface 400 may, for example, correspond to the microservice orchestration graphical user interface 262 and the metrics acceleration graphical user interface 264, which, in various embodiments, may or may not be part of the resource capacity prediction graphical user interface 278. The graphical user interface 400 may be generated and updated while the microservices orchestration progresses and may graphically indicate the progression of the microservices orchestration. For example, the graphical user interface 400 may be generated and updated in real time or near real time as the microservice orchestration, the resource metrics acceleration, and the collecting resource system observation data is being performed updated in real time or near real time as the microservice orchestration, the resource metrics acceleration, and the collecting resource system observation data is being performed and/or may be available after the microservice orchestration, the resource metrics acceleration, and the collecting resource system observation data has been at least partially performed.

Portions of the microservices orchestration (e.g., steps/operations of the microservices orchestration) may be graphically represented by the graphical user interface 400. The portions may correspond to nodes that are graphically represented by the graphical user interface 400. Components (e.g., corresponding to the nodes) of the graphical user interface 400 may graphically indicate (e.g., by way of color coding and check marks as in the depicted example, and/or by way of any other suitable graphical indicia) which portions of the orchestration, acceleration, and collection have been performed and whether or not the portions have executed successfully. Each component of the graphical user interface may be user-selectable to drill down and expose details of the orchestration component, reveal successfully executed steps, reveal unsuccessfully executed steps, allow for a troubleshooting where applicable for unsuccessful steps, and/or the like. The graphical user interface 400 may be displayed and interacted with using a client computing device 102.

As indicated by 402, variables may be defined for the microservice orchestration, metrics acceleration, and resource data collection. There may be a plurality of different resource capacity metrics for different CPUs that need to be processed. For example, there may be, say, ten or more resource capacity metrics for different CPUs running Windows, Linux, and AIX for CPU, memory, and storage. The resource allocation mappings may be used to map host identifier; host type; CPU type, specifications and/or metrics; memory type, specifications and/or metrics; storage type, specifications and/or metrics; date/time values; and/or the like. As indicated by 404, a data prep function may obtain the rest API calls that are relevant for a specific resource metric. For example, one specific resource metric may correspond to total processor time for one or more Windows-running processors. As indicated by 406, a burst of API calls (e.g., 16 rest API calls) and corresponding microservices caused by the API calls may be run simultaneously.

The microservice orchestration function builder may automatically orchestrate and cause execution of a multitude of microservices simultaneously, causing a series of sets of parallel microservices, where each set of parallel microservices is a function of a particular type of resource data. For example, in various embodiments, each set of parallel microservices may be a function of a particular resource capacity metric and may be directed to pulling, aggregating, and/or consolidating resource data of that particular resource capacity metric type. Each of the nodes of the parallel processor branches may be the assigned unique names.

The microservice orchestration function builder may be configured to write code with different payloads, very efficiently generating many lines of code (e.g., thousands, tens of thousands, such as 30,000 lines or more) from a relatively small set of base code seeded with different resource metric parameters. Without the microservice orchestration function builder, a corresponding process with conventional methods would take a very long time to run. However, the orchestration features, including the automatic code generation features, of the microservice orchestration function builder may provide for achieving desired results with significant process acceleration such that the results can be obtained in a small fraction of the time that would be otherwise required with all manual steps being eliminated in some embodiments.

The microservice orchestration function builder may be configured to use intelligent parallelization as a function of the large-scale numbers and varieties of resources that are the subject of the resource capacity prediction features. The intelligent parallelization may include intelligent coordination of microservices that are purposely built as a function of resource capacity metrics so that the load is shared by a plurality of servers and so that each set of parallel microservices is executed in a short period of time (e.g., 15 minutes or less) with temporarily dedicated compute space of the cloud infrastructure system 130-1. In some embodiments, the microservice orchestration function builder may, for example, use a set (e.g., a list) of many rest API calls (e.g., hundreds, thousands or more) and may split the set into subsets (e.g., smaller lists) of equal size, or more or less equal size. For example, a set of 1,000 API calls may be split into 16 separate lists (e.g., sub-lists) of as equal size as possible. Each sub-list may be processed so that the micro services can only run in 15 minutes or less, while running simultaneously to increase speed because 16 different processes may be running on 16 different machines at the same time. In various embodiments, once the resource data for a particular resource capacity metric has been pulled, aggregated, consolidated, integrity checked, and/or the like, the microservice process may continue for a different resource capacity metric.

For example, as indicated by 408, a data prep function may obtain the rest API calls that are mapped to a different resource metric, such as CPU idle time. As indicated by 410, another burst of API calls and corresponding microservices caused by the API calls may be run in parallel. Once that portion of the microservice flow is completed, the process may repeat again for another resource metric, such CPU idle time per CPU, as indicated by 412 and 414. Further, the process may continue in like manner for a plurality of resource metrics. Such resource metrics may include any suitable resource metric, such as CPU utilization, total CPU processor time, CPU processor time per CPU, memory utilization, storage utilization, memory used, memory available, memory committed, page life expectancy, swap memory percent used, swap memory free megabytes, and/or the like.

Referring again to FIG. 3A, resource system observation data may be collected as indicated by block 318. Although depicted separately, the collection of resource system observation data may be a part of the microservice orchestration 310, with the collection of resource system observation data including the collection of the resource metrics data per the microservice orchestration 310. The observation data may include the resource metrics data mapped to the plurality of resources provided by the cloud infrastructure system 130-1 and/or the server system 130.

As indicated by block 320, the resource system observation data may be consolidated. As indicated by block 322, resource data composites may be developed. For example, resource data composites 272 may be created with the resource metrics data, which may, for example, be resource data for five-minute intervals aggregated on a daily level such that each resource data composite may be mapped to a particular date. The aggregation and consolidation of the resource data may include identifying and discarding redundant resource data and/or data not specified for retention in the resource data composites 272, converting and/or translating items of resource data into forms, formats, and units specified for the resource data composites 272 (e.g., language translation, numeral system conversion, numeral formatting, significant figures modification, precision tailoring, measurement unit conversion, timestamp formatting and conversion, etc.), and/or the like.

The aggregation of the resource data and/or the development of resource data composites 272 may be a function of resource type. For example, resource data corresponding to storage may be treated differently than resource data corresponding to CPU and memory which may vary throughout the day much more than storage. Thus, for example, resource data for storage may be aggregated once a day instead of at five-minute intervals and may be aggregated according to file system level in order to capture resource data for file systems that mount to multiple hosts.

As another example, page life expectancy data may be aggregated at a weekly level, and the subsystem 200 may determine whether page life for a particular host has been suffering over a weekly level. The page life expectancy data may correspond to a memory metric that may measure memory other than just raw memory. The page life expectancy data and indicia of whether page life for a particular host has been suffering may be trended at a weekly level.

In some embodiments, resource data may be extracted and/or resource data composites 272 may be created only when a data change with respect to the resource data has been detected (e.g., by way of detecting a change bit, a change flag, or a checksum). Accordingly, redundant extraction and/or generation operations may be eliminated for static data. When the resource data is determined to correspond to static data with respect to multiple dates/times, the resource data and/or composites may be propagated in the time-based data structure using a vector of the static data in order to forward fill the data and represent the static data according to the time scale (e.g., X-minute intervals, hourly, daily, etc.).

The resource data composites 272 may include the particular resource metrics data mapped in a data structure to specifications of host (e.g., a particular server), operating system, date, minimum, fifth percentile, tenth percentile, twenty-fifth percentile, average, seventy-fifth percentile, ninetieth percentile, ninety-fifth percentile, max, and/or the like. Further, such metrics may be determined as a function of type of operating system, with algorithms varying depending on operating system. For example, the processing for memory metrics for Linux machines may be unique and may involve obtaining four separate metrics then accounting with calculations for all the Java memory heap. The resource data composites 272, having resource data curated and cleaned (e.g., as resource data composites 272) for use in resource capacity prediction features disclosed herein, may be stored in a resource data repository 208-2 of the data storage system 208 (e.g., in the one or more target databases). In some embodiments, this may include curating and appending resource data composites 272, which may include daily level metrics, on a daily basis to the curated resource data set, to build and develop the data set over time of resource data composites 272 for use in ongoing trending and predictions.

It should be understood that only a portion of the microservice orchestration 258, resource metrics acceleration 260, and collecting resource system observation data 268 may be represented in the example depicted in FIG. 4A. The microservice orchestration may continue the sequential bursts of microservice parallelization for any suitable resource metrics. Such sequential parallelization of microservices may be constructed to, among other things, advantageously allow for pinpointing and troubleshooting sources of failure in the large process. For example, if the failure occurs partway down the process, the graphical user interface 400 may graphically indicate where in the sequence the failure occurred.

Further, in some embodiments, with a large number of resources, not all the resources need to be treated, but certain resources could have a higher priority than others. Based at least in part on recognized pattern data for particular resources, the resource capacity prediction engine 214 may learn, for example, which resources have a higher priority (e.g., as a function of the criticality attributes of the resources) and/or which have port changes with respect to any one or a combination of the resource data aspects with greater frequency and/or on a more regular basis. Thus, in some embodiments, while some iterations of the method 300 may be performed with respect to a complete set of resource data and resource metrics, subsequent iterations of the method 300 may be performed with respect to a subset of resource data and resource metrics as a function of determining that previously generated resource capacity predictions, generated as disclosed further herein, satisfy one or more thresholds.

For example, when a resource capacity prediction indicates that one or more metrics of one or more particular resources exceed one or more criticality thresholds, one or more subsequent iterations may be targeted to the resource data, resource metrics, and resources that are mapped to the resource capacity prediction that exceed the one or more criticality thresholds. Accordingly, the subsystem may intelligently adapt resource acquisition data to focus on certain resources more than on other resources at certain times based at least in part on recognized pattern data. The subsystem 200 may, for example, change the defined event in response to determining the exceeded one or more thresholds so that one or more targeted iterations may be executed on a more frequent temporal basis, while, in some embodiments, the method 300 may continue to be performed with respect to the complete set of resource data and resource metrics on a less frequent temporal basis (e.g., a default basis corresponding to a default defined event).

Figure 4B:
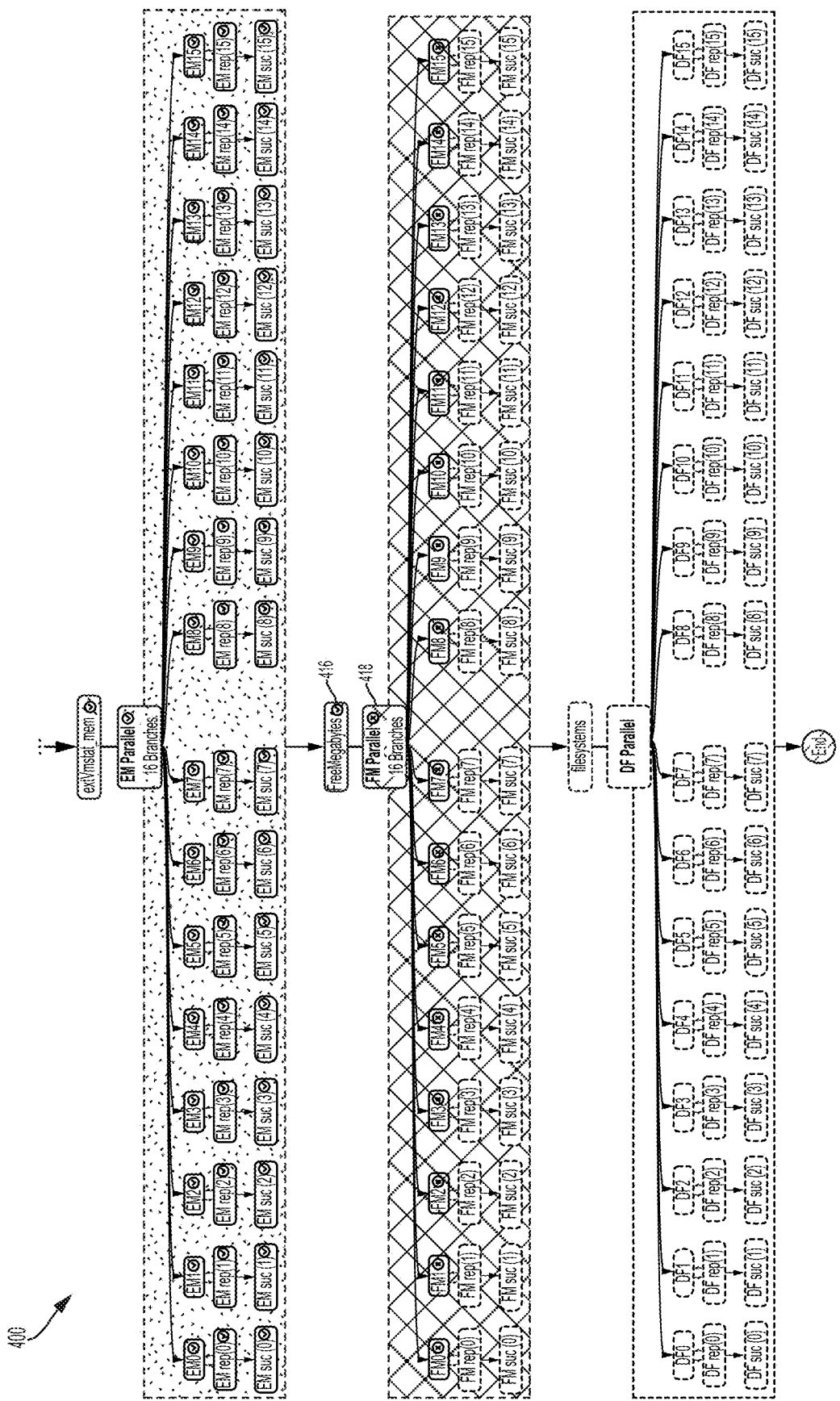

FIG. 4B depicts another portion of the example graphical user interface 400 representing another part of the microservice orchestration 258, the resource metrics acceleration 260, and the collecting resource system observation data 268, in accordance with embodiments according to the present disclosure. The depicted portion illustrates what may be an end portion of the microservice flow continued from FIG. 4A, after a plurality of portions corresponding to the continued microservice flow have been executed, most of which are not shown for the sake of simplicity of description. As indicated by 416, a data prep function may obtain the rest API calls that are mapped to another resource metric, such as free megabytes.

By way of example with respect to the metrics failure recognition 266 features, as indicated by 418, the graphical user interface 400 may graphically indicate that a failure occurred and the execution of the corresponding burst of API calls and microservices, for example, by way of color coding and Xs as in the depicted example, and/or by way of any other suitable graphical indicia. Further, the graphical user interface 400 made graphically indicate that subsequent portions of the microservice flow that were to be executed after the failure in the parallel branches 418 did not execute.

Figure 4C:
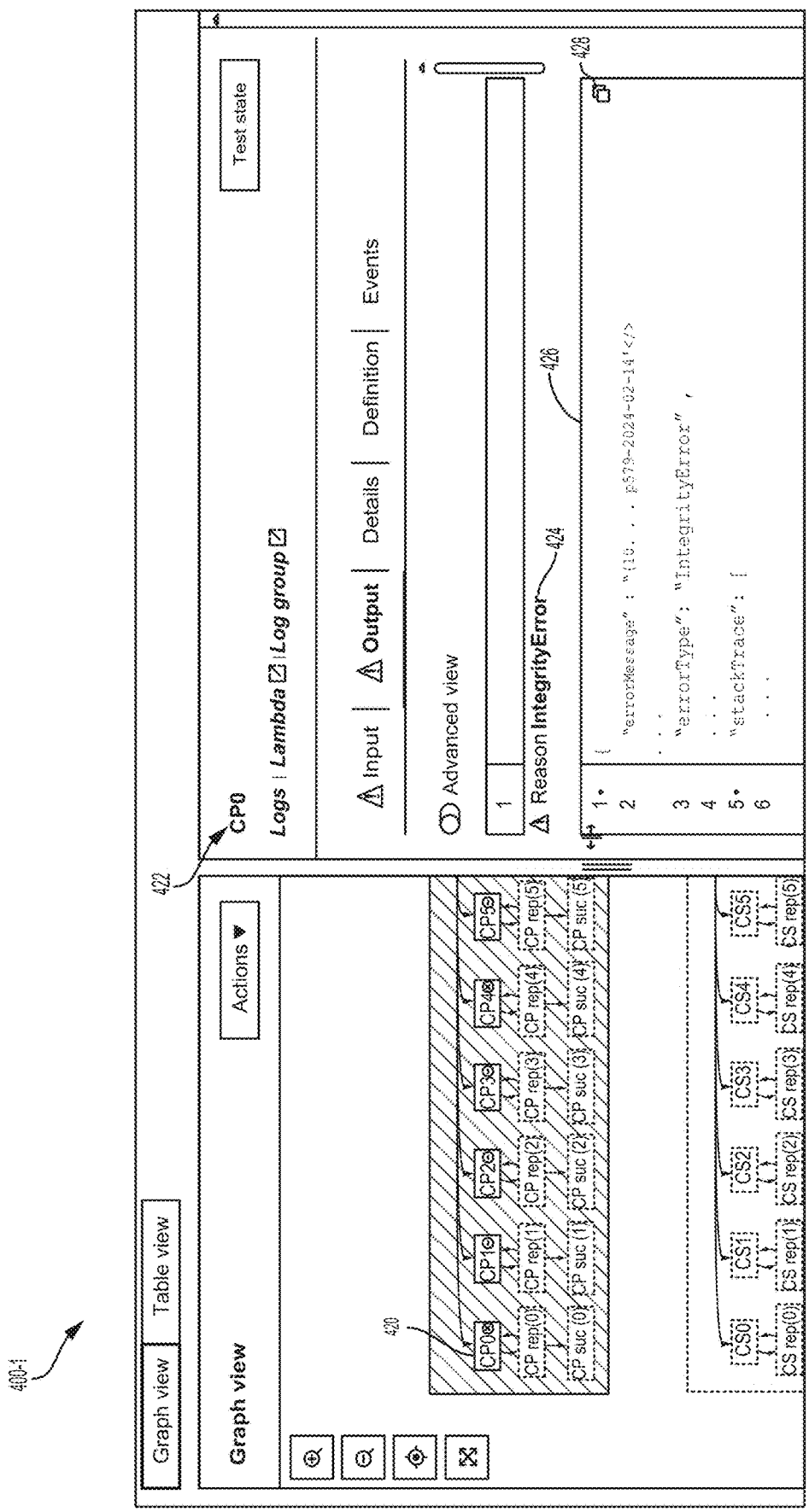
FIGS. 4C and 4D depict an example of the graphical user interface indicating a node where a failure occurred, in accordance with disclosed embodiments according to the present disclosure.
Figure 4D:
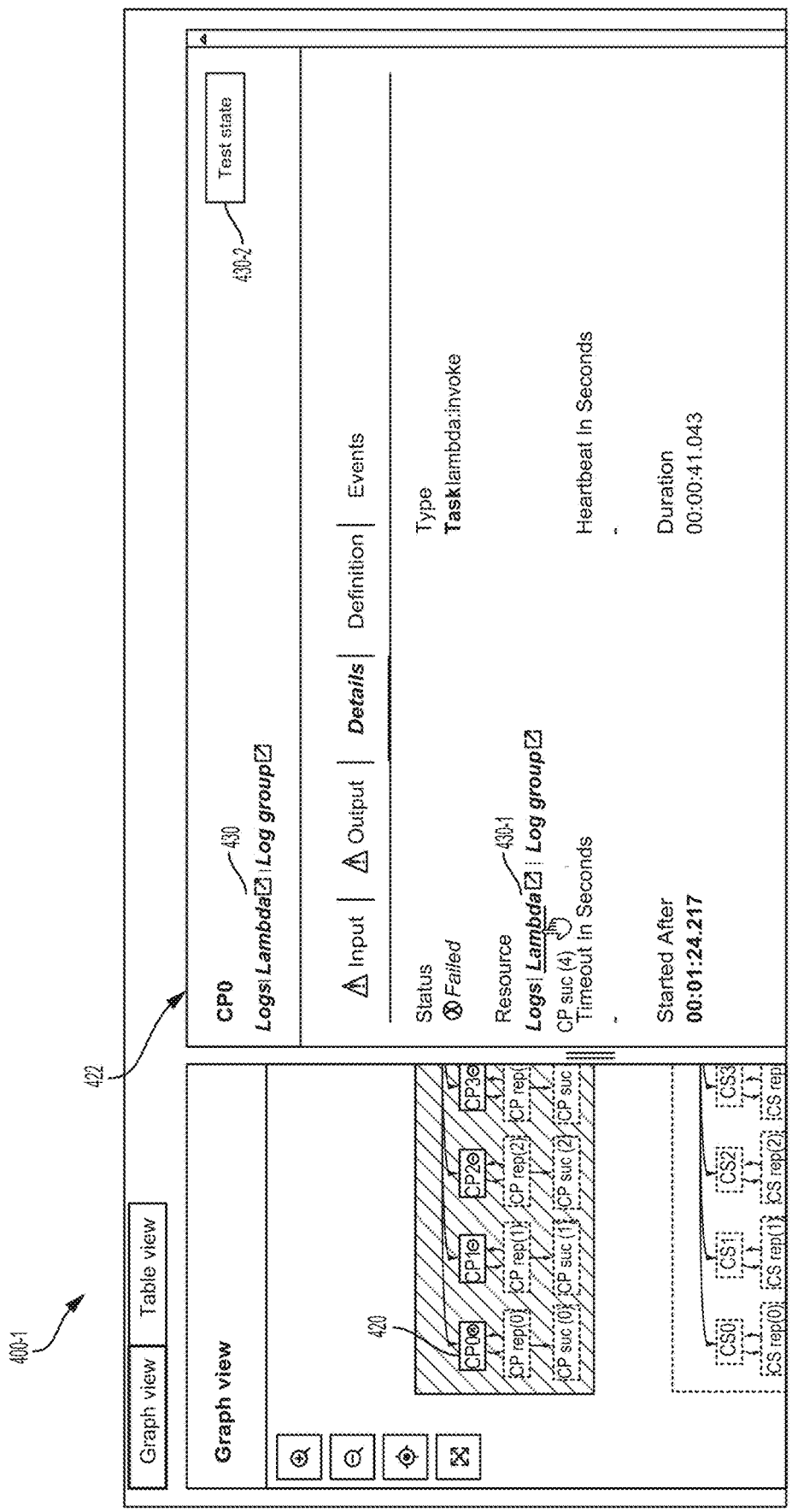

Moreover, with the metrics failure recognition 266 features, the graphical user interface 400 may instantly indicate the exact node where the failure occurred, efficiently providing a very clear view of when and where something fails, so a user need not spend a lot of time digging to see where it happened and why it happened. For example, FIGS. 4C and 4D depict an example of the graphical user interface 400 indicating a node 420 where a failure occurred, in accordance with embodiments according to the present disclosure. One or more portions of the graphical user interface 400 corresponding to the parallel branches 418 may be user-selectable interface elements that allow our user to select the failure-indicated portion in order to reveal details about the node and event that experienced the failure. In the depicted example, the node 420 may be user-selectable to reveal an interactive troubleshooting interface 422 that surfaces details about the recognized node failure event, pinpoints one or more lines of code corresponding to the error, and allows repeat testing of the input and corresponding code with the same microservice function.

For example, the interface 422 may reveal a reason for error 424 and log details 426 about the error. The log details 426 may indicate the one or more lines in the code corresponding to the output and the error, as well as the corresponding microservice function. The subsystem 200 may automatically identify various types of issues. For example, the subsystem 200 may identify integrity errors and sources of such errors such as a duplicate record that violates an aggregation and consolidation rule with an integrity constraint of one host to one metric for one day and that may be due to a server failover or flip-over, resulting in a partial day metric from one host and a partial day metric from another host because one API call may cause processing as if there are two different records that being pushed to a repository of the subsystem 200. The interface 422 may include user-selectable interface elements to examine the input, the details, definitions, and events corresponding to the error. Further, the interface 422 may include one or more user-selectable interface elements 428 to copy the input and the corresponding code in order to allow repeat testing of it with the same microservice function. The interface 422 may include one or more user-selectable interface elements 430 to select the corresponding microservice that experiences the error and the reproduce the microservice execution and/or test the microservice execution with different input and/or code (e.g., with the same script or a changed/different script) in order to run it interactively to pinpoint the issue and test corrections.

Referring to FIG. 3B, adaptive resource capacity prediction may be performed, and capacities for each selected resource and/or set of resources may be modeled using the resource data composites 272, as indicated by block 324. As disclosed herein, the subsystem 200 may use the capacity prediction engine 214 to perform the adaptive resource capacity prediction and model the resource capacities. In some embodiments, the resource capacity prediction engine 214 may be configured to employ machine learning or, more specifically, deep learning, to facilitate creation, development, and/or use of particularized resource capacity pattern and prediction data. The resource capacity prediction engine 214 may include a reasoning module to make logical inferences from a set of the detected and differentiated data to infer one or more resource capacity patterns and predictions for particular resources. A pattern-based reasoner may be employed to use various statistical techniques in analyzing the data in order to infer particularized resource capacity patterns and predictions using the resource data composites 272. A transitive reasoner may be employed to infer relationships from a set of relationships related to the observation data. In various embodiments, the subsystem automatically establishes and develops the particularized pattern data.

Based at least in part on the resource data composite that are based at least in part on the observation data, the subsystem 200 may select prediction rules from a plurality of prediction rules as a function of one or more particular resource metrics and use the selected prediction rules to identify a subset of the plurality of resources based at least in part on determining which of the plurality of resources have corresponding resource metrics data that satisfy one or more metrics thresholds. The one or more metrics thresholds may be determined by the selected prediction rules and may be selected from a plurality of different thresholds as a function of one or more metric types and/or resource types. Additionally or alternatively, the subsystem 200 may use the selected prediction rules to predict resource capacities for the subset of the plurality of resources as a function of the one or more particular resource metrics.

By way of example, the subsystem 200 may use a different method of modelling the resource capacity predictions depending on the particular resource and/or resource metric, as indicated by block 326. Accordingly, the resource capacity prediction modeling may be a function of the particular resource metric, and the capacity prediction engine 214 may be configured with capacity prediction logic to learn, select, and apply capacity prediction rules as a function of one or more particular resource metrics. By way of example with respect to CPU and memory, capacity prediction rules may be selected by the capacity prediction engine 214 as a function of one or more particular CPU and/or memory metrics and may be applied to particular resource data composites 272 corresponding to the one or more particular CPU and/or memory metrics.

Using the selected capacity prediction rules, the capacity prediction engine 214 may accelerate and target predictions to critical resources, as indicated by block 328. The capacity prediction engine 214 may, for example, determine which hosts are currently over one or more particular metric thresholds (e.g., 80% in the past three weeks, where the maximum metric value reached above 80% in the past three weeks and/or where the 90th percentile and/or the 95th percentile was greater than 60% in the past X time period). The capacity prediction engine 214 may select a subset of the hosts and corresponding resource data composites 272, depending on which hosts satisfy the one or more particular metric thresholds, as qualifying for forecasting. Accordingly, by executing at least part of the selected capacity prediction rules on the particular resource data composites 272, the capacity prediction engine 214 may intelligently accelerate the prediction process, increase efficiency, and identify critical resources, rather than unnecessarily performing forecasting for all resources and resource composites 272 (which may number on the order of hundreds, thousands, or more) thereby wasting resources in the process and obfuscating critical predictions. Additionally or alternatively, in some embodiments, the forecasting for different resource types (e.g., for CPU, memory, disk, pagelife, and swap memory) may be executed simultaneously, for example, executing separate scripts, each with logic tailored to a particular resource type, in parallel.

Additionally or alternatively, using the selected capacity prediction rules, the capacity prediction engine 214 may, for example, perform metrics stabilization processes, as indicated by block 330. By executing at least part of the selected capacity prediction rules on the selected subset of particular resource data composites 272 (which may include raw daily data, say, for each of the subset of servers for the past 90 days), the capacity prediction engine 214 may perform pattern recognition to identify particular resource data composites 272 that include one or more numbers of spikes and/or outliers that satisfy/exceed a spike threshold and/or an outlier threshold. Accordingly, the capacity prediction engine 214 may scrub for outliers that could affect the models and may use the highest first quantile, the forward failover high values, to make sure that no outliers overly influence the models. For example, using a first threshold, the capacity prediction engine 214 may identify particular resource metrics where the 95th percentile for each day compared to the previous day is determined to have jumped more than 30%. The capacity prediction engine 214 may perform pattern recognition to determine the number, frequency, and/or magnitude of the spikes in the particular resource metric data over a certain time period. If the capacity prediction engine 214 determines that the number, frequency, and/or magnitude of the spikes satisfies/exceeds one or more number, frequency, and/or magnitude thresholds, then the capacity prediction engine 214 may flag the spiky data for the particular time period as requiring cleaning and healing for prediction processes and may use alternative data as a basis for predictions.

To develop the alternative data, the capacity prediction engine 214 may clean the spiky data, using pattern recognition and breaking up the spikes to detect regular trends. For example, if the data has a certain magnitude above 98% and has a certain slope or if it's above 94%, the data may be aggregated to the weekly level, taking a weekly level metric of the daily metrics in order to generate a stable metric using quantile methods so that it is not as affected by outliers. The selected, stabilized, and otherwise prepared subset of resource data composites 272 may be used to forecast trends, for example, to determine if the trends suggest that in the next 30 days that particular resources could be exhausted. In some embodiments, a linear regression may be performed with the selected, stabilized, and otherwise prepared subset, the R-squared value may be calculated, and it may be determined if the R-squared value is relatively strong and satisfies/exceeds an R-squared value threshold. The weekly level slope may be divided by seven to convert the slope to a daily slope for predictions with the models. As indicated by block 332, resource prediction profiles corresponding to the models may be stored (e.g., in the target database(s)).

As indicated by block 334, resource capacity dashboard parallelization and generation as a function of resource type may be performed (e.g., by the capacity prediction engine 214 and/or the capacity control engine 216). As indicated by block 336, this may include compiling the models, including the predicted trends, and performing analytics, selections, and preparation of forecasts for the resource capacity prediction GUI 278. In some embodiments, this may be executed according to resource type in parallel, as indicated, for example, by blocks 338, 340, and 342, for CPU and memory forecasting, disk forecasting, and pagelife and swap memory forecasting, respectively. In some embodiments, separate scripts, each with logic tailored to a particular resource type (e.g., for CPU, memory, disk, pagelife, and swap memory) may be executed in parallel.

The subsystem 200 may select a subset of the resource capacity predictions based at least in part on determining which of the resource capacity predictions satisfy one or more prediction thresholds. If, for example, an entity has 5,000 servers, it is not practical for, say, an app owner, to monitor all 5,000 servers at the same time. However, the subsystem 200 may identify, say, the top five or the top ten most critical server predictions in order to better assist the app owners keeping apprised of predicted problems. A different methodology, which may include one or more different prediction thresholds, may be used for each different type of resource and/or type of metric to determine if the forecast should be included in the data sets loaded into the dashboard. Accordingly, one or more prediction thresholds may be selected from a plurality of different thresholds as a function of type of resource and/or type of metric. In some examples, if a forecast is predicted to exceed a prediction threshold in the next month (for example, a server's utilization is predicted to exceed 100% in the next month such that the server may run out of capacity within the next month), then the forecast may be selected to be included in the data sets loaded into the dashboard. Accordingly, if the utilization is trending up and predicted to, in the next days, exceed a threshold, the subsystem 200 may provide a notification of the prediction and allow for preemptive actions to be taken via the GUI 278.

As indicated by block 344, an instance of the resource capacity prediction GUI 278 may be generated, with the generation processes including loading the selected resource capacity prediction data into the capacity dashboard. The resource capacity prediction GUI 278 may provide visualizations of the selected resource capacity predictions for particular resources and/or resource types, corresponding resource capacity prediction models, and/or data based thereon, which may be exposed via one or more interfaces of the capacity dashboard. The GUI 278 may be generated automatically and may, for example, indicate at various levels which hosts, servers, and applications are predicted to be at risk of running out of memory, CPU, disk, and/or the like in the next X days (e.g., the next 30 days).

As indicated by block 346, the subsystem 200 may facilitate one or more preemptive actions 282 (indicated with FIG. 2) with respect to one or more incidents identified based at least in part on the resource capacity predictions. In some embodiments, the preemptive actions 282 may include requesting more resources automatically or responsive to user selection(s)/command(s), for example, by causing transmitting of a service request to the cloud infrastructure system 130-1 to secure more memory, more server capacity, etc. and/or generating a ticket to do so. In some embodiments, the preemptive actions 282 may include subsystem-acceleration of the service request with a set of objects and/or fields of the service requests and/or tickets that may be subsystem-populated using one or a combination of the linked resource data composites 272, mappings, and/or pop-ups. The subsystem 200 may, in some embodiments, decrease input required for the service requests and/or the tickets based at least in part on learning, with feedback look features disclosed herein, input required for service requests and/or tickets over time so that the subsystem-populated service requests and/or tickets conform to a set of input requirements for the service requests and/or the tickets that the subsystem 200 may learn over time.

FIGS. 5A, 5B, 5C, 5D, and 5E illustrate portions of an exemplary resource capacity prediction interface 278-1 that may be used in presenting visualizations and providing resource capacity features, in accordance with embodiments of the present disclosure. The portions illustrated may correspond to part of the capacity dashboard. The formatting of the data and features presented is merely one example and may correspond to a spreadsheet format in some embodiments, whereas various embodiments may present the data in any suitable format. The resource capacity prediction interface 278-1 may provide a current snapshot of the predictions and may identify a mapping of hosts 502, applications 504, statuses 506, and indicia of issues 508 as a function of various resource types, such as CPU, memory, and disk as illustrated for example. Other resource types not shown may also be included in some embodiments. In some embodiments, the mapping may include other associated information, such as responsible users, and may include selectable interface options allowing for control of resources and making remote changes to resource configurations to preemptively accommodate predicted resource demands. The statuses 506 for each mapping may include various states, such as a red state with a one-month exhaustion warning (e.g., a warning of complete utilization within one month), an amber state with a two-month to four-month exhaustion warning, and a green state with no warning (i.e., corresponding to a low risk of exhaustion in the upcoming four-month window). Other embodiments may use any other suitable graphical indicia to indicate the statuses 506.

The resource capacity prediction interface 278-1 may include an expandable summarization portion 510. As in the depicted example, the summarization portion 510 may include a summary of red issues 512. The summary of red issues 512 may indicate the total number of issues identified for the various resource types, the prior basis number of issues identified for the various resource types corresponding to the previous predictions (e.g., yesterday's predictions, last week's predictions, last X days predictions, etc.), and the percentage of improvement between the current predictions and the prior predictions. In the example depicted, the summarization portion 510 indicates summarization information for red-state predictions. Accordingly, the mapping exposed by the resource capacity prediction interface 278-1 may be at the application level, which, without the disclosed embodiments, would be very difficult for large-scale entities that may, for example, have a thousand or more servers. Moreover, while some resources are depicted in the example with a green status, other embodiments may depict only, or may be interface selectable to depict only, those with a red status or only those with a red status and those with an amber status. Thus, in some embodiments, the capacity dashboard may expose only those resources where the predictions satisfy one or more thresholds of risk of exhaustion in the upcoming temporal windows in order to flag and highlight those predictions to facilitate tracking of critical infrastructure identified within large-scale operations.

Figure 5A:
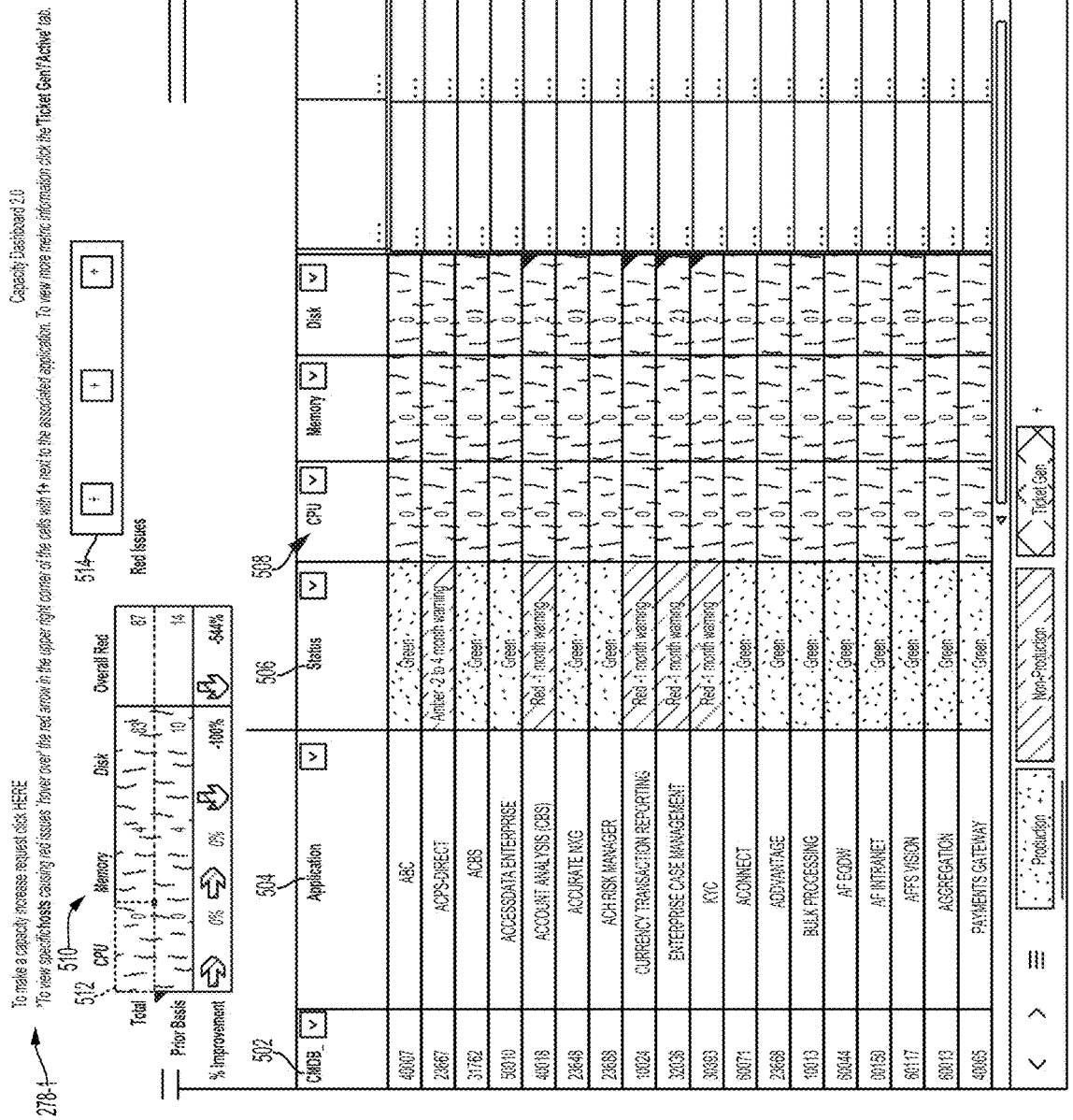
FIGS. 5A, 5B, 5C, 5D, and 5E illustrate portions of an exemplary resource capacity prediction interface 278-1 that may be used in presenting visualizations and providing resource capacity features, in accordance with disclosed embodiments according to the present disclosure.
Figure 5B:
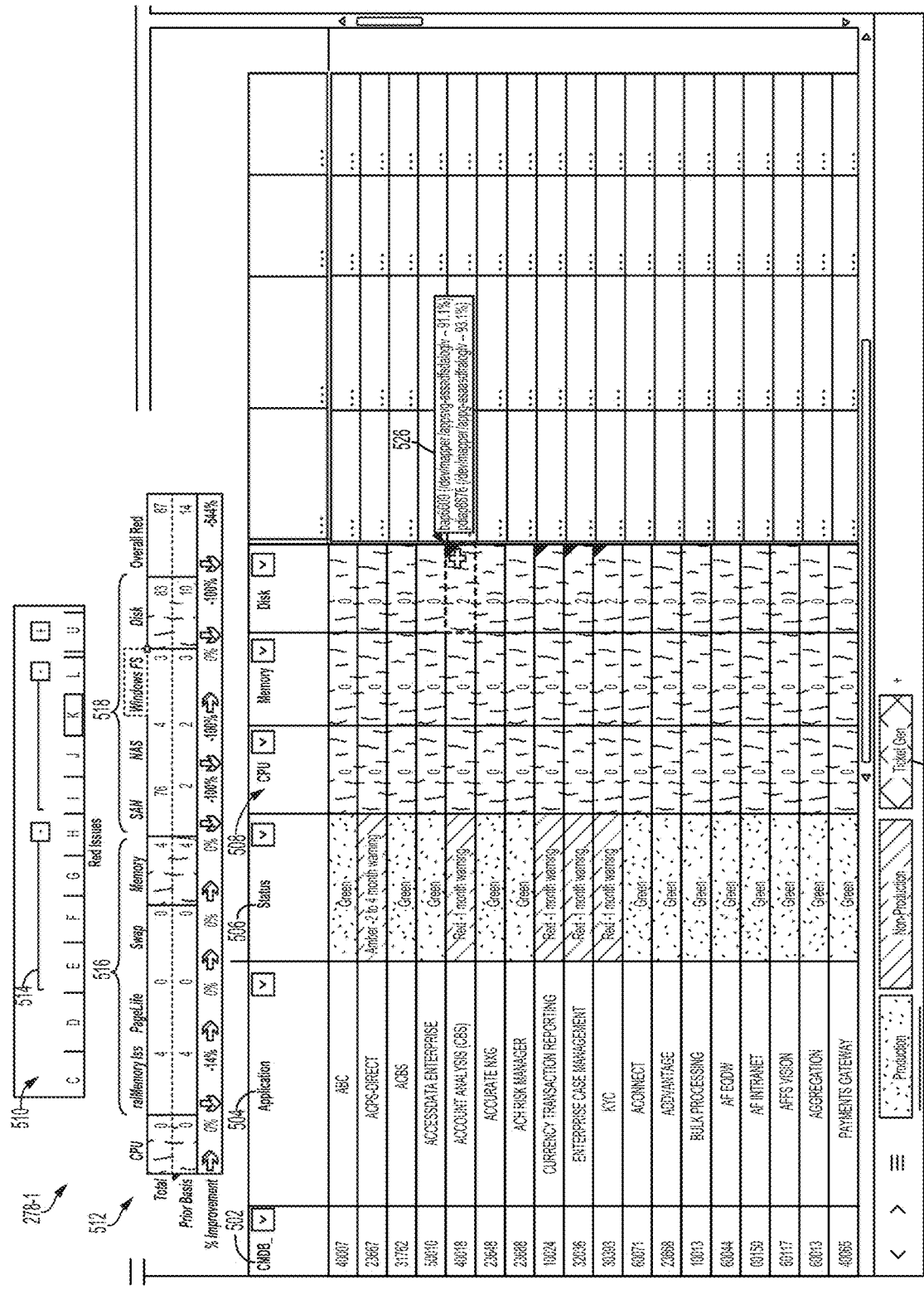
Figure 5C:
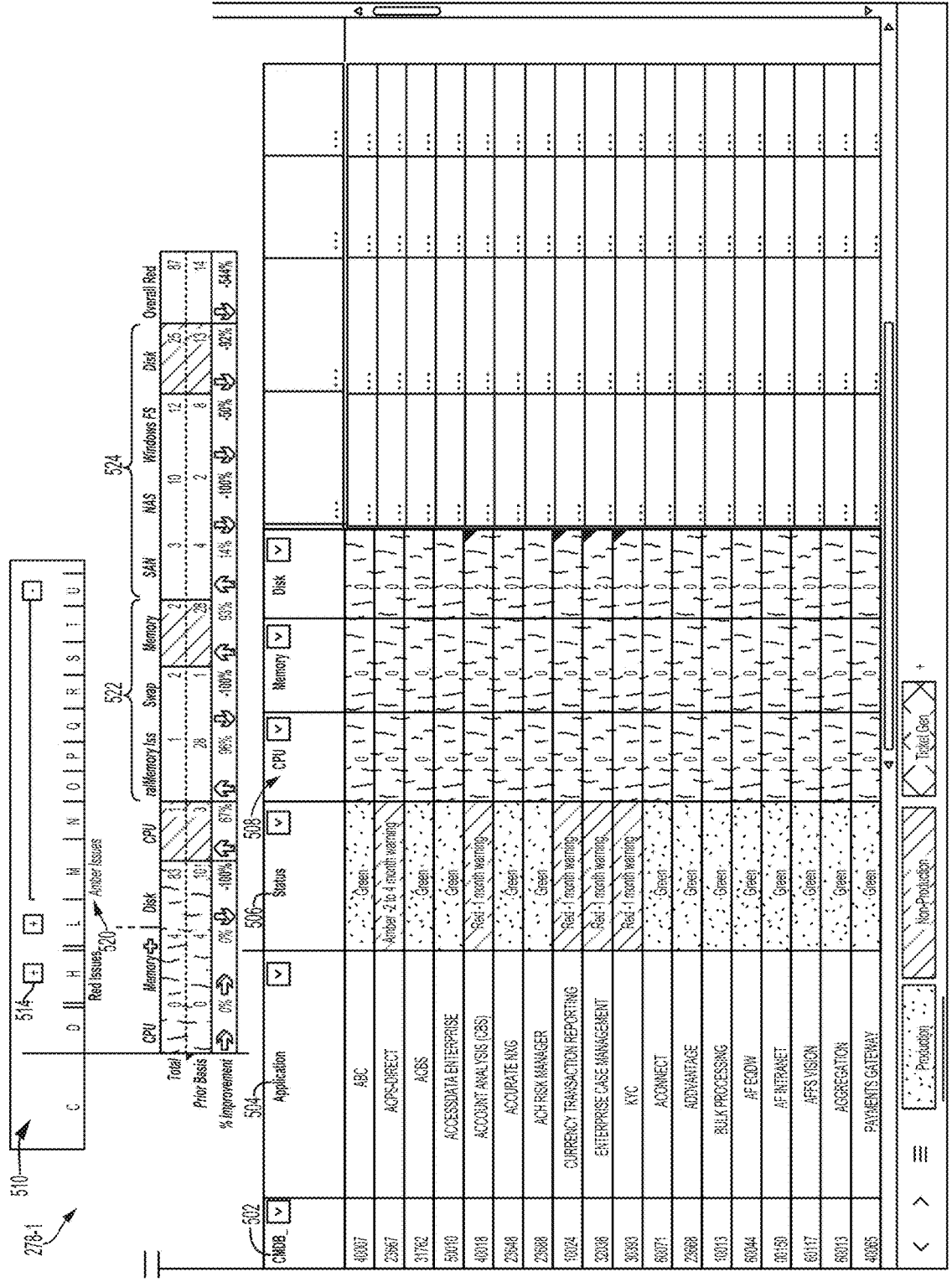

The summarization portion 510 may include user-selectable options 514 to expand the summarization portion 510. For example, as shown in FIG. 5B, the user-selectable options 514 may allow for selectable expansion of the summary of red issues 512 to drill down and reveal different types of memory issues 516. For example, upon expansion, the memory issues 516 may specify whether the identified issues are general memory issues, page life issues, swap memory issues, and/or the like. Likewise, the user-selectable options 514 may allow for selectable expansion of the summary of red issues 512 to drill down and reveal different types of disk issues 518. For example, upon expansion, the disk issues 518 may specify whether the identified issues are SAN issues, NAS issues, Windows file system issues, and/or the like. Further, as shown in FIG. 5C, the user-selectable options 514 may allow for selectable expansion of the summarization portion 510 to reveal a summary of amber issues 520. The user-selectable options 514 may also allow for selectable expansion of the summary of amber issues 520 to drill down and reveal different types of amber memory issues 522 and/or amber disk issues 524.

Moreover, the resource capacity prediction interface 278-1 may be configured to allow for hover-to-reveal features where, for example, a user may hover over particular cells corresponding to the indicia of issues 508 identified. For example, as depicted in FIG. 5B, a user has moved a cursor to hover over a cell for a particular mapping of a host 502, an application 504, and a status 506 with two identified and graphically flagged disk issues 508. Responsive to the hover-over operation, a pop-up 526 may be generated. The pop-up 526 may allow for drill-down into specifics of the prediction issues. For example, the pop-up 526 may indicate (e.g., with a selectable note card), for each issue, the server name, the particular storage file system, an indication of the current metric (e.g., the current disk utilization metric), a predicted date of complete exhaustion (e.g., complete utilization) and/or the like data, and, if there was an incident created, the incident identifier.

Figure 5D:
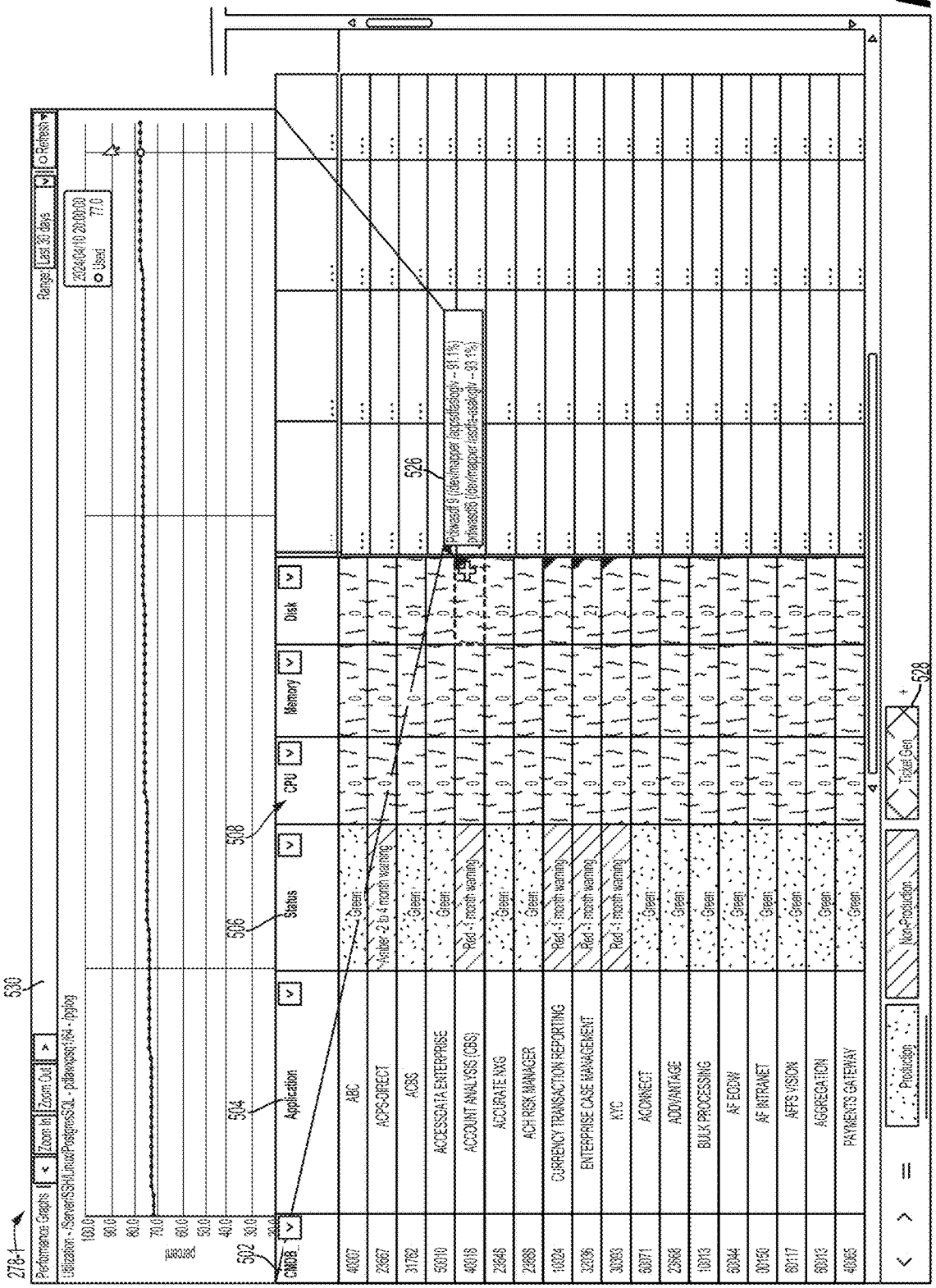

In some embodiments, the hover-over-triggered pop-up 526 may be selectable to further drill-down into more specifics. For example, the pop-up 526 may be selectable to surface more metric information, the prediction data, graphs and other visualizations of the prediction(s), and/or the like features which may, for example, be based at least in part on the pop-up 526 being linked to one or more resource data composites 272 to facilitate the features. By way of example, FIG. 5D illustrates a selectable visualization 530 of the current, past, and predicted utilization over time of the particular server in graph form based at least in part on one or more models for the server. The selectable visualization 530 may indicate the predicted date of exhaustion and may be further selectable (e.g., with windowing zoom functions on the graph to zoom in or zoom out on particular graph portions with a dynamic window) to reveal more specifics of the forecasting. In various embodiments, the selectable visualization 530 may be presented as a pop-up, a window, in a new tab, and/or the like. In some embodiments, the pop-ups 526 and/or the cells corresponding to the hosts 502, applications 504, statuses 506, and/or indicia of issues 508 may include hyperlinks to facilitate the selectable revealing of the additional metric information, the prediction data, graphs and other visualizations of the prediction(s) particularized to the incident, and/or the like features. For example, hyperlinks for each red or amber issue may be added to the pop-ups 526 and/or cells that may allow for selection to be taken to the actual raw data for servers (e.g., in a new tab), graphs, etc. In some embodiments, only the pop-ups 526 and/or the cells corresponding to predictions classified as red states or amber states may be selectable to provide such features.

Additionally or alternatively, in some embodiments, the pop-up 526 may be selectable to take preemptive actions 282 (indicated with FIG. 2) with respect to the identified incident(s). In some embodiments, the preemptive actions 282 may include requesting more resources, for example, by causing transmitting of a service request to the cloud infrastructure system 130-1 to secure more memory, more server capacity, etc. and/or generating a ticket to do so. Additionally or alternatively, in some embodiments, a separate selectable interface element 528 may be selectable to take preemptive actions 282 and cause transmitting of a service request to the cloud infrastructure system 130-1 to secure more memory, more server capacity, etc. and/or generating a ticket to do so. In some embodiments, the preemptive actions 282 may include subsystem-acceleration of the service request with a set of objects and/or fields of the service requests and/or tickets that may be subsystem-populated using one or a combination of the linked resource data composites 272, mappings, and/or pop-ups 526.

Figure 5E:
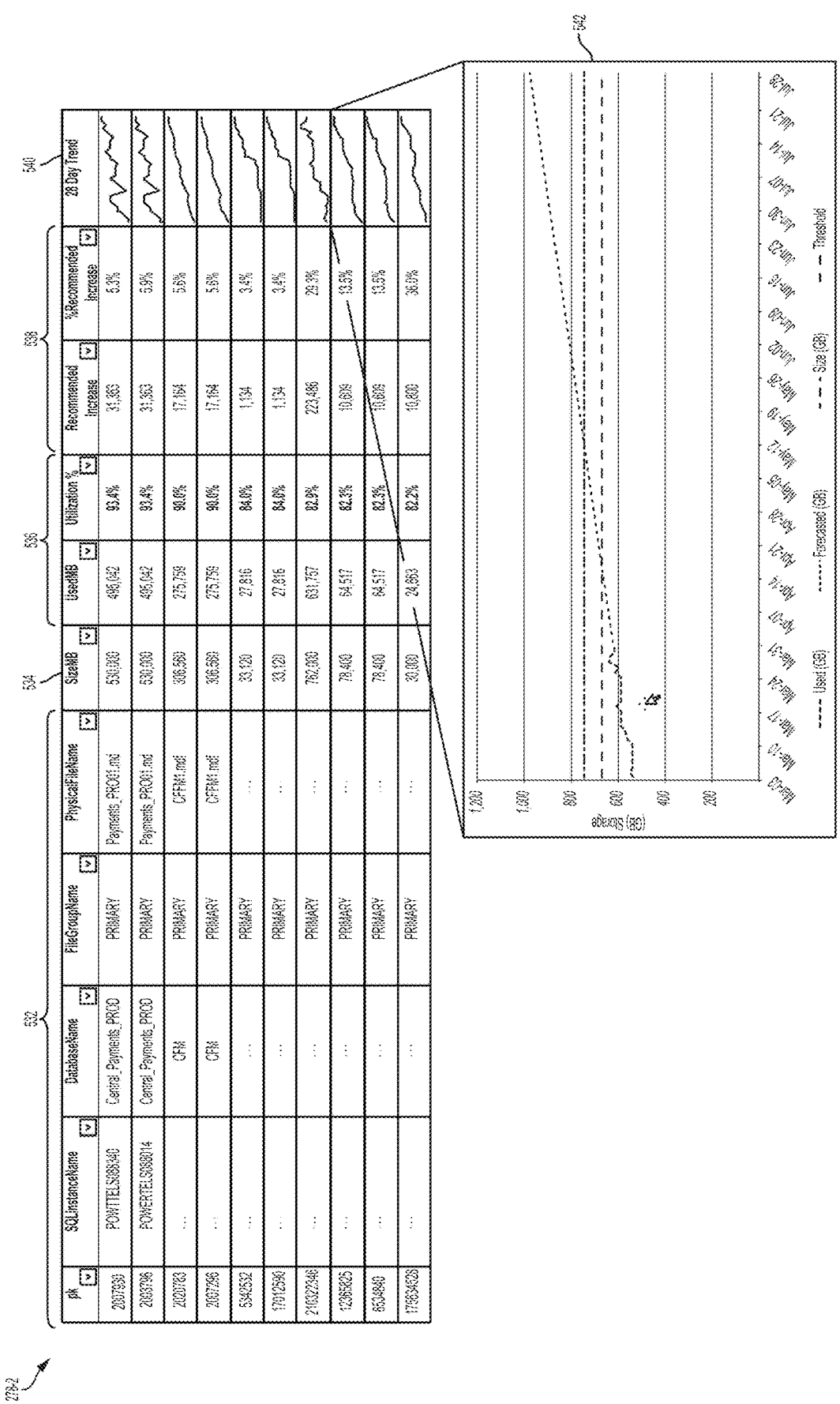

The resource capacity prediction interface 278-1 may be selectable to provide a condensed representation of only the red issues or only the red issues along with the amber issues. For example, FIG. 5E illustrates another portion of the resource capacity prediction interface 278-2 with select resources organized according to highest utilization. The illustrated example may correspond to the top ten most critical predictions identified by the subsystem 200 and presented in a ranked order. In some embodiments, such a condensed representation or a hyperlink to the condensed representation may be transmitted (as part of the smart alert 280 features indicated in FIG. 3) to select individual accounts, for example, via email, instant messaging, and/or the like to alert (in real time or near real time consequent to the prediction process being completed) responsible individuals about the criticalities and recommended actions.

Mappings 532 of database identifiers, file group identifiers, physical file identifiers, and/or the like may be provided along with size specifications 534, utilization metrics 536, recommended increases 538, and condensed, selectable snapshots of the prediction graphs 540. While the illustrated portion shows one example of resource types and metrics being presented, other embodiments are possible. Although not shown in FIG. 5E, hover-over pop-up 526 features may likewise be provided with the condensed representation. Furthermore, the cells may be selectable to provide various features as discussed above. By way of example, each of the prediction graphs 540 may be selectable to open a selectable visualization of the particular prediction, such as the illustrated prediction visualization 542. The prediction visualization 542 may show more detail about the corresponding prediction graph 540. The prediction visualization 542 may, for example, illustrate the amount of storage used, the forecasted amount of utilization, the size of the storage, and one or more thresholds.

Referring again to FIG. 2, the capacity prediction engine 214 and/or the capacity control engine 216 may be configured to perform prediction process adaptation 284, employing an ongoing machine learning mode to confirm, correct, and/or refine determinations made for the capacity predictions, recognition, and/or characterizations. For example, having come to one or more conclusions about capacity predictions, recognition, and/or characterizations, the subsystem 200 may confirm and/or correct the determinations with feedback loop features that may include learning from subsequent executions of part or all of method 300. Thus, for example, having generated capacity predictions, recognition, and/or characterizations for an upcoming time window (e.g., the next 30 to 90 days), the subsystem 200 may subsequently learn and generate updated capacity prediction rules, capacity predictions, recognition, and/or characterizations after one or more portions of the time window have passed (e.g., after one or more weeks have passed), and the subsystem 200 may use the updated resource capacity data, metrics, predictions, etc. for training the subsystem 200 models to heuristically adapt capacity prediction rules, capacity predictions, recognition, and/or characterizations. Such learning may include learning the capacity prediction rules as a function of one or more particular resource metrics based at least in part on the resource data composites 272 and/or feedback loop features.

Additionally, the feedback loop features may include feedback options. For example, the subsystem 200 may provide the capacity prediction interface 278 with feedback options to facilitate the ongoing learning mode. User-selectable options provided with notifications (e.g., push notifications to the client computing devices 102, pop-up/modal windows with the interface 278, and/or the like) may be provided to allow administrative confirmation or correction of capacity predictions, recognition, and/or characterizations. The feedback may also be used for training the subsystem 200 models to heuristically adapt capacity predictions, recognition, and/or characterizations.

The subsystem 200 may further provide for complete control of sub-environments 286 that may be selectively created and destroyed, spun up and spun down on the fly, with quality assurance (QA) features that may allow for rapid, efficient development and testing in the sub-environments 286. The sub-environments 286 may be configured to allow for isolation of data structures during such development and testing. For example, the subsystem 200 may provide for a QA table controller configured to facilitate rapid development and testing in the sub-environments 286. In some embodiments, the QA table controller may be provided by a rapid development and testing engine 218. The rapid development and testing engine 218 may be configured like one or more of the engines 212, 214, and/or 216, and, in various embodiments, one or more of the engines 212, 214, and/or 216 may include or otherwise provide the rapid development and testing engine 218. The rapid development and testing engine 218 may be configured to create the sub-environments 286 for rapid development.

By providing the sub-environments 286, the subsystem 200 may eliminate the need to have a production environment and a QA environment for testing changes with scripts, for example, which environments can be very expensive and can require one or more separate servers to provide proper segregation so that production is not impacted and test scripts can be tested and experimented with without risk of affecting current data or any schemas. The sub-environments 286 may provide for a very quick, lightweight way for testing and development, providing the ability to be very reactive in development life cycle without having to spin up a new environment. While source schemas in source data storage repositories (e.g., databases provided by cloud services) and source data structures (e.g., tables stored in the databases) may be provided in a cloud environment by the cloud infrastructure system 130-1, the sub-environment may be created within the cloud environment. The sub-environments 286 render unnecessary any need to request an account through the cloud infrastructure system 130-1, acquisition of server, set up all the parameters, make service requests to a remote system 130, obtain approvals, obtain access rights, set up credentials, etc. that can be very costly and time-consuming. Instead, the rapid development and testing engine 218 may use the same environment in which the sub-environments 286 may be created so that there is no extra cost and so that safe experimentation, testing, and development may be provided without having to wait for a long time (e.g., weeks or a month) to requisition what otherwise would be needed to obtain a new environment.

Figure 6A:
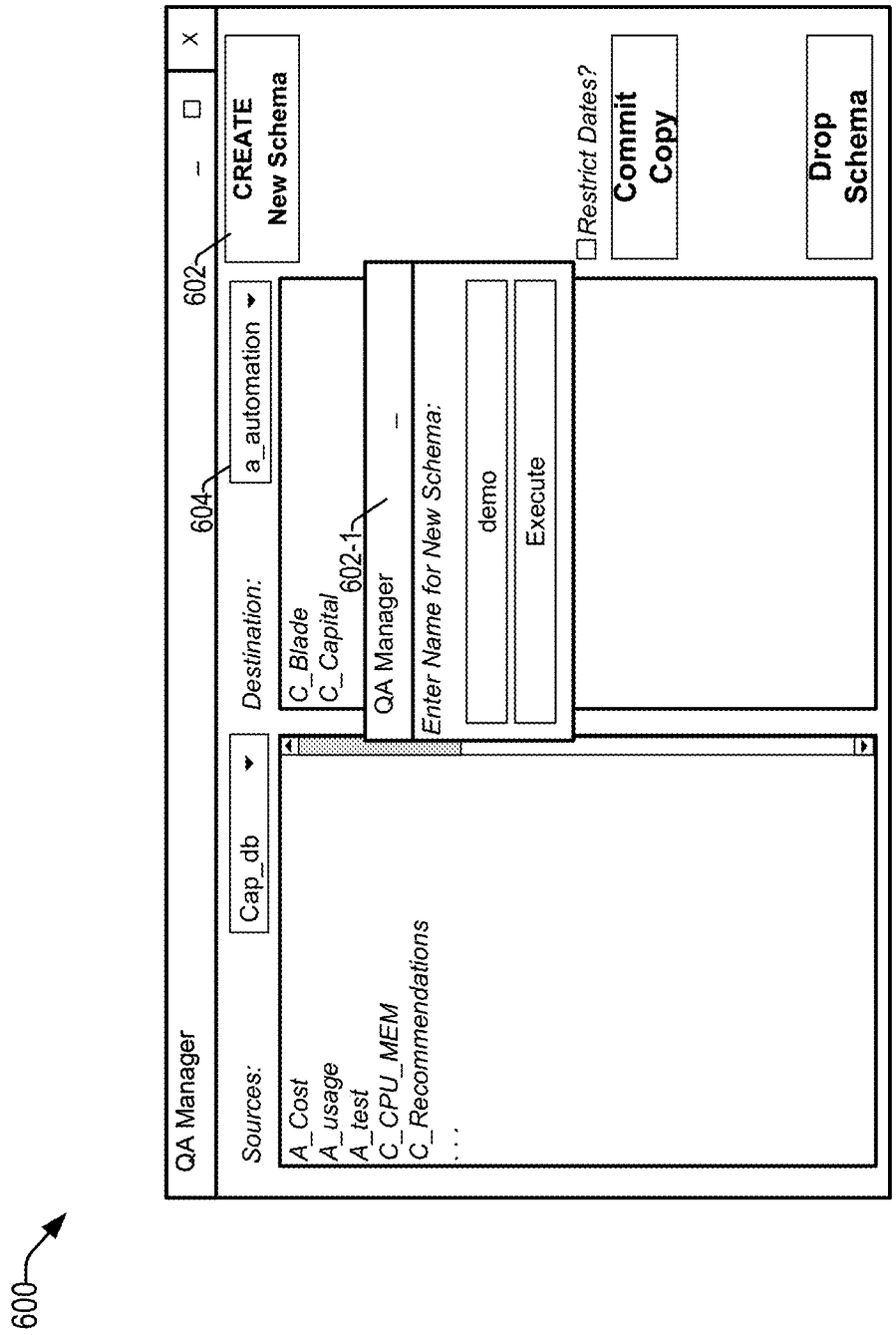
FIGS. 6A, 6B, and 6C illustrate portions of an exemplary sub-environment interface configured to facilitate rapid development and testing in sub-environments, in accordance with embodiments of the present disclosure, in accordance with disclosed embodiments according to the present disclosure.
Figure 6B:
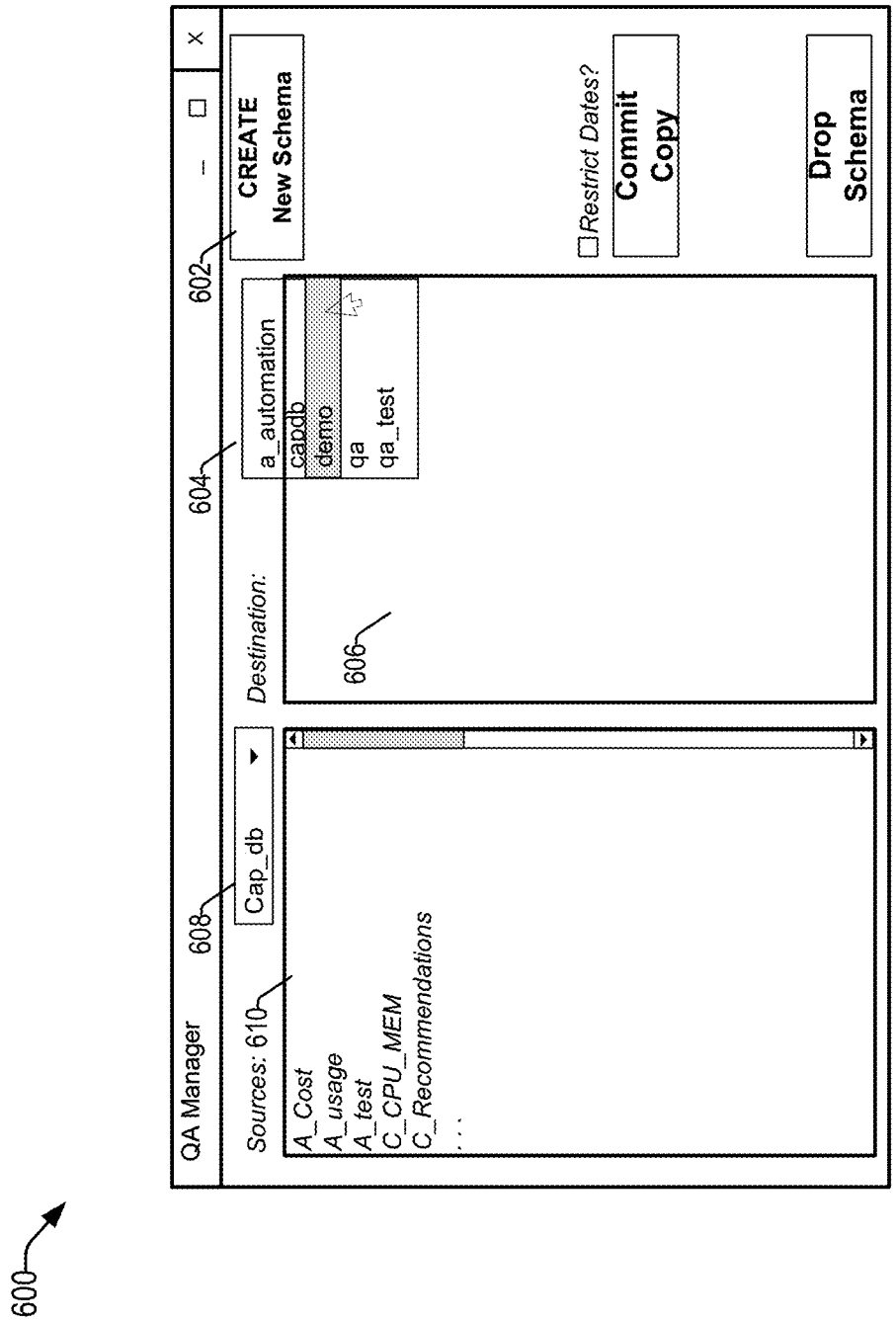
Figure 6C:
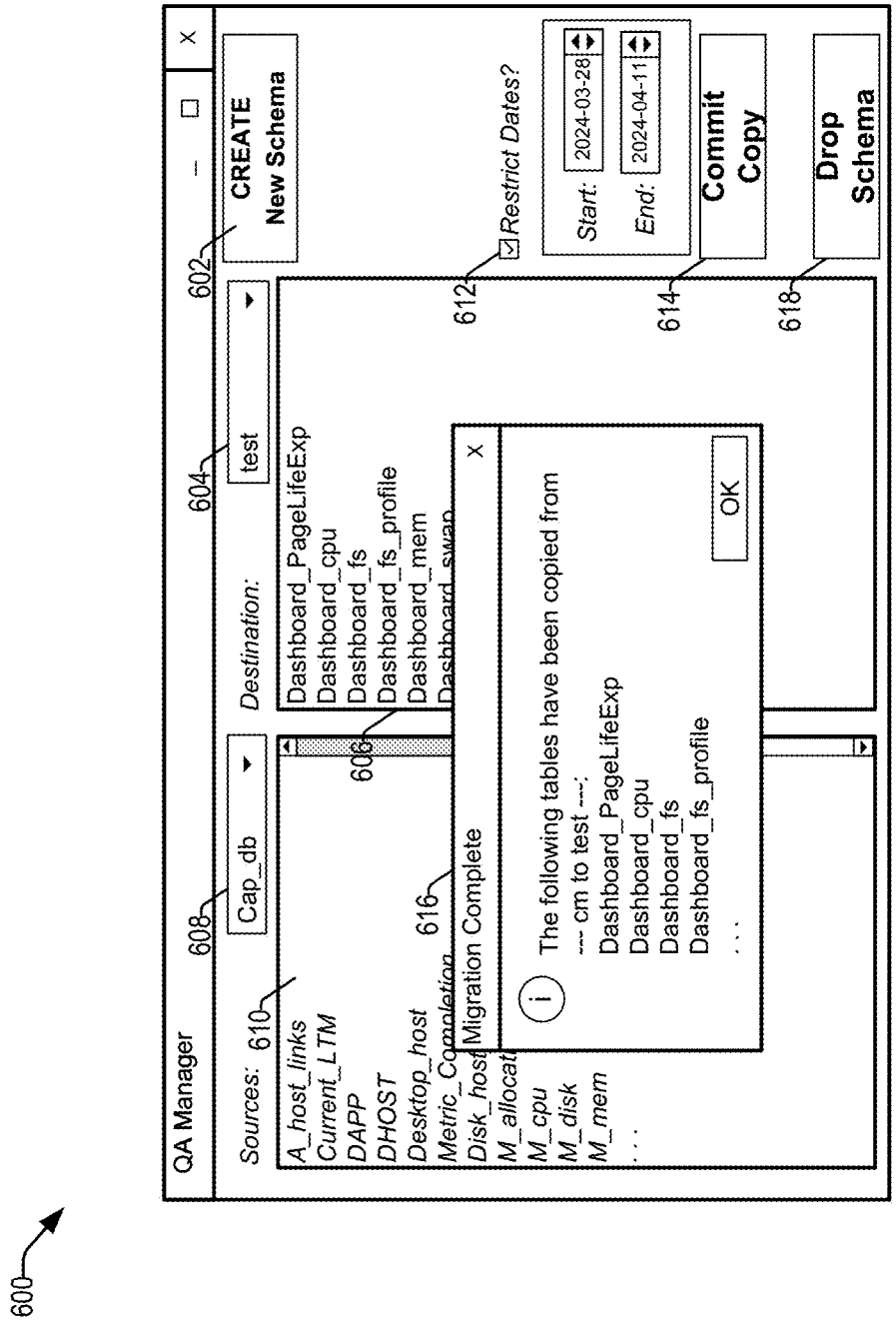

FIGS. 6A, 6B, and 6C illustrate portions of an exemplary sub-environment interface 600 configured to facilitate rapid development and testing in the sub-environments 286, in accordance with embodiments of the present disclosure. In various embodiments, the sub-environment interface 600 may be included in or separate from the resource capacity prediction interface 278. Referring to FIG. 6A, the sub-environment interface 600 may include one or more schema creation controls 602 configured to allow for creation of a new schema (e.g., corresponding to a database). The one or more schema creation controls 602 may include one or more selectable user interface elements that may allow for user entry of a name for the new schema (e.g., with a pop-up) and user-initiated execution to spin up the new schema.

The sub-environment interface 282 may further include one or more destination schema controls 604 configured to allow selection of a destination schema. The one or more destination schema controls 604 may include selectable user interface elements configured to facilitate selection of the destination schema. In some embodiments, the one or more selectable user interface elements may include the form of a drop-down list, which may list, for example, a newly created schema identifier and/or a previously created schema identifier. Once the new schema identifier has been created, it may be listed on the drop-down list, for example.

Referring to FIG. 6B, the newly created schema identifier may be selected as the destination schema via the one or more destination schema controls 604. The sub-environment interface 600 may include a destination population portion 606 that lists data structures (e.g., tables) selected for population in the destination schema. Initially, with a newly created schema identifier, the destination population portion 606 may be empty, since no tables have been selected for the schema.

The sub-environment interface 600 may further include one or more source schema controls 608 configured to allow selection of one or more source schemas. The one or more source schema controls 608 may include one or more selectable user interface elements that, in some embodiments, may include the form of a drop-down list that lists source schemas from which a developer may want to copy source data to the destination schema in order to, for example, test one or more scripts on the copy of the source data that may be populated in the destination schema. The source schemas may, for example, include a particular database such as a production database and/or one of the databases corresponding to data storage system 208 storing resource system allocation data 2081, resource data 208-2, resource prediction data 208-3, and/or the like, which may have been recently updated per method 300. When a particular source (e.g., a particular database) has been selected via the one or more source schema controls 608, a source list portion 610 may list all the data structure (e.g., tables) that are available on the selected source. A developer may select one or more data structures (e.g., tables), on which the testing may subsequently be performed, directly from the source list portion 610. Once the developer selects (e.g., clicks on) a particular data structure identifier from the source list portion 610, the sub-environment interface 600 may remove that selected data structure identifier from the source list portion 610 and add the selected data structure identifier to the destination population portion 606.

Referring to FIG. 6C, a developer may select a plurality of tables from the source list portion 610 to have them placed in the destination population portion 606, as in the example depicted. Additionally, one or more different sources may be selected via the one or more source schema controls 608, and one or more additional data structures may be selected from the one or more different sources for inclusion in the destination population portion 606 such that data structures from different source schemas may be copied to the destination schema so that the destination schema includes a combination of data structures from different schema sources. By providing the ability to select specific data structures for copying to the destination schema, the subsystem 200 may allow for a customized sub-environment to be created such that only targeted data structures are used and tested upon in the sub-environment. Copying all data structures from the source schema may be unnecessary for the testing and development purposes.

After all the data structures that are desired to be copied to the new schema have been selected, the data structures may be listed in the destination population portion 606. The sub-environment interface 600 may further include one or more date restriction controls 612 configured to allow user selection of dates to restrict the copying of temporally keyed data structures to selected dates such that only one or more portions of one or more of the data structures are copied to the destination schema (i.e., those portions, such as parts of tables, corresponding to the date restrictions on the source data). The subsystem 200 may identify any date fields in the selected data structures and use the date fields to filter the data that is copied over to the destination schema. This may minimize the amount of data that may need to be moved from the one or more source schemas to the destination schema (and, hence, time of migration, particularly if very long transactional databases are involved) and may also allow targeting to specific dates of interest (e.g., the last 30 days of utilization data and/or capacity prediction data, the next 30 days of capacity prediction data, the following 31 to 60 days of capacity prediction data, etc.).

Additionally or alternatively, the sub-environment interface 600 may further include one or more application restriction controls (similar to controls 612 but not shown) configured to allow user selection of particular applications to restrict the copying of data structures to one or more selected applications such that only one or more portions of one or more of the data structures mapped to fields with the one or more selected applications are copied to the destination schema. The subsystem 200 may identify any application fields in the selected data structures and use the application fields to filter the data that is copied over to the destination schema. This may facilitate targeted testing with respect to particular resource system allocation data 2081, resource data 208-2, resource prediction data 208-3, and/or the like.

The sub-environment interface 600 may further include one or more commit copy controls 614 configured to allow the user to select when to commit copies of the selected source data structures to the destination schema. When the one or more commit copy controls 614 are selected, the migration of the selected source data structures, or portions thereof, may be executed. To facilitate the migration, the subsystem 200 may take the data structures from the selected one or more source schemas that are selected for the destination population portion 606 to create a migration plan to migrate copies of the one or more data structures to the destination schema for testing in the created sub-environment 286. The migration plan may include one or more definitions of the one or more data structures that should be copied to the destination schema. The one or more definitions may, for example, specify one or more tables, every single element in each table, data types of the elements, how much space and memory are being reserved for every single column, and/or the like.

The subsystem 200 may execute a migration according to the migration plan. The subsystem 200 may use the migration plan, including the one or more definitions, to design and create the destination schema to match the selected one or more selected source data structures and at least part of the one or more selected source schemas (which may correspond to the destination schema forming a composite of the selected one or more source schemas). Then, the subsystem 200 may use the one or more definitions to import all the source data, copying the data from one schema to another, for example, querying (e.g., using REST API calls) the one or more source schemas for the selected source data structures and pushing copies of the data structures into the created destination schema. Once the migration is complete, one or more notifications 616 may be presented to indicate the completion.

In some embodiments, the sub-environment interface 600 may further include one or more script controls configured to allow the user to transition to a sub-environment testing interface. The sub-environment testing interface may be configured to allow for a user to create or select a script to execute and test on the destination schema. In various embodiments, the script may correspond to a dummy script and/or application that may be executed with respect to the destination schema along with its variables and associated configurations stored in a template. The subsystem 200 may be configured to facilitate the testing per user selections of selectable interface elements of the sub-environment testing interface, while implementing safeguards to ensure that the user cannot impact production data and can only execute scripts with respect to the destination schema. The sub-environment interface 600 may further include one or more schema drop controls 618 configured to allow the user to drop the destination schema (e.g., clear the schema data from the QA controller and delete and/or dereference the destination schema) when the testing is complete and the destination schema is no longer needed. The subsystem 200 may implement safeguards to ensure that only the destination schema is dropped and that no production data is affected.

Figure 7:
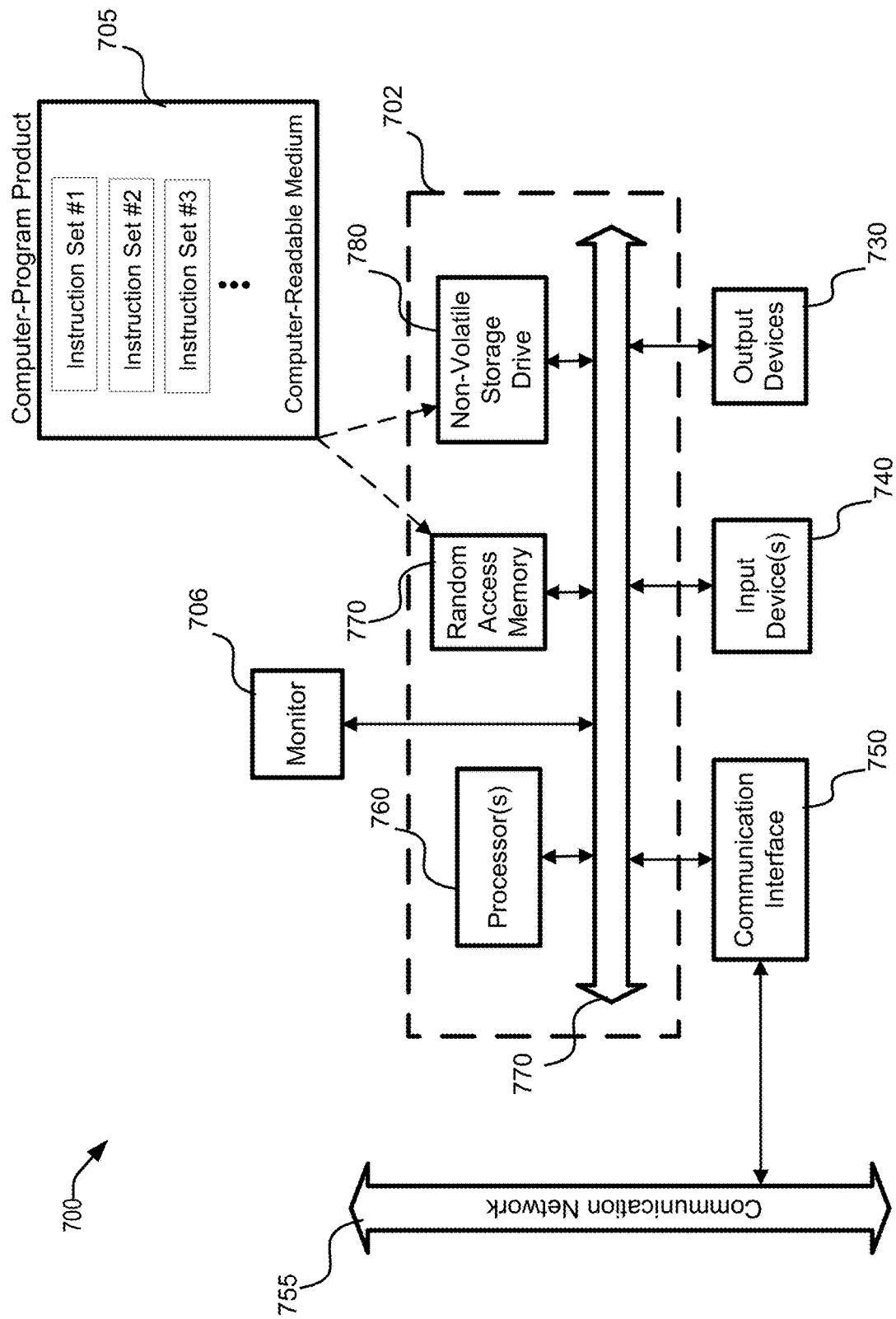
FIG. 7 illustrates a special-purpose computer system, in accordance with disclosed embodiments according to the present disclosure.

With reference to FIG. 7, an embodiment of a special-purpose computer system 700 is shown. The above methods may be implemented by computer-program products that direct a computer system to perform the actions of the above-described methods and operations. In various embodiments, the special-purpose computer system 700 may implement the subsystem 200. In various embodiments, the computer system 700 may correspond at least in part to one or more of the adaptive processing and control devices 202, the client computing devices 102, the server system 130, the cloud infrastructure system 130-1, and/or the remote system 140. Each such computer-program may comprise sets of instructions (codes) embodied on a computer-readable medium that directs the processor of a computer system to perform corresponding actions. The instructions may be configured to run in sequential order, or in parallel (such as under different processing threads), or in a combination thereof. Merely by way of example, one or more procedures described with respect to the method(s) discussed herein might be implemented as code and/or instructions executable by a computer (and/or a processor within a computer); in an aspect, then, such code and/or instructions can be used to configure and/or adapt a general purpose computer (or other device) to perform one or more operations in accordance with the described methods, transforming the computer into the special-purpose computer system 700.

As discussed further herein, according to a set of embodiments, some or all of the procedures of such methods are performed by the computer system 700 in response to processor-execution of one or more sequences of one or more instructions (which might be incorporated into the operating system and/or other code, such as an application program) contained in the operating memory. Such instructions may be read into the operating memory from another computer-readable medium, such as one or more of the non-transitory storage device(s). Merely by way of example, execution of the sequences of instructions contained in the operating memory might cause the processor(s) to perform one or more procedures of the methods described herein.

Special-purpose computer system 700 may include a computer 702, a monitor 706 coupled to computer 702, one or more additional user output devices 730 (optional) coupled to computer 702, one or more user input devices 740 (e.g., joystick, keyboard, mouse, track ball, touch screen buttons, switches, control handles, and/or the like) coupled to computer 702, a communications interface 750 coupled to computer 702, a computer-program 705 stored in a tangible computer-readable memory in computer 702. Computer program 705 directs system 700 to perform the above-described methods. Computer 702 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer program 705 may be stored in non-volatile storage drive 780 or another computer-readable medium accessible to computer 702 and loaded into memory 770. Each processor 760 may comprise a microprocessor, such as a microprocessor from Intel® or Advanced Micro Devices, Inc.®, or the like. To support computer-program 705, the computer 702 runs an operating system that handles the communications of 705 with the above-disclosed components, as well as the communications between the above-disclosed components in support of the computer-program 705. Exemplary operating systems include Windows® or the like from Microsoft® Corporation, Solaris® from Oracle®, LINUX, UNIX, and the like. The processors 760 may include one or more special-purpose processors such as digital signal processing chips, graphics acceleration processors, video decoders, image processors, and/or the like.

User input devices 740 include all possible types of devices and mechanisms to input information to computer system 702. These may include a keyboard, a keypad, a mouse, a scanner, buttons, control handles, switches, a digital drawing pad, a touch screen incorporated into the display, audio input devices such as voice recognition systems, microphones, and other types of input devices. In various embodiments, user input devices 740 may be embodied as a computer mouse, a trackball, a track pad, a joystick, buttons, control handles, switches, wireless remote, a drawing tablet, a voice command system. User input devices 740 typically allow a user to select objects, icons, text and the like that appear on the monitor 706 via a command such as a click of a button or the like. User output devices 730 include all possible types of devices and mechanisms to output information from computer 702. These may include a display (e.g., monitor 706), printers, non-visual displays such as audio output devices, etc. Some embodiments may not have a separate monitor 706, but may have the monitors integrated with input devices and/or output devices, such as mobile devices, touchscreen devices, etc.

Communications interface 750 provides an interface to other communication networks 755 and devices and may serve as an interface to receive data from and transmit data to other systems, WANs and/or the Internet. Embodiments of communications interface 750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 750 may be coupled to a computer network, to a FireWire® bus, or the like. In other embodiments, communications interface 750 may be physically integrated on the motherboard of computer 702, and/or may be a software program, or the like. In further examples, the communications interface 750 may be part of a communications subsystem, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem may permit data to be exchanged with a network (such as the network described below, to name one example), other computer systems, and/or any other devices described herein.

RAM 770 and non-volatile storage drive 780 are examples of tangible computer-readable media configured to store data such as computer-program embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 may be configured to store the basic programming and data constructs that provide the functionality of various embodiments of the present invention, as described above. The above are examples of one or more non-transitory storage devices that may be utilized by the system 700. Such storage devices may be configured to implement any appropriate data stores, including without limitation, various file systems, database structures, and/or the like.

Software instruction sets that provide the functionality of the present invention may be stored in RAM 770 and non-volatile storage drive 780. These instruction sets or code may be executed by the processor(s) 760. RAM 770 and non-volatile storage drive 780 may also provide a repository to store data and data structures used in accordance with the present invention. RAM 770 and non-volatile storage drive 780 may include a number of memories including a main random access memory (RAM) to store of instructions and data during program execution and a read-only memory (ROM) in which fixed instructions are stored. RAM 770 and non-volatile storage drive 780 may include a file storage subsystem providing persistent (non-volatile) storage of program and/or data files. RAM 770 and non-volatile storage drive 780 may also include removable storage systems, such as removable flash memory. Bus subsystem 770 provides a mechanism to allow the various components and subsystems of computer 702 communicate with each other as intended. Although bus subsystem 770 is shown schematically as a single bus, alternative embodiments of the bus subsystem may utilize multiple busses or communication paths within the computer 702.

The above methods may be implemented by computer-program products that direct a computer system to control the actions of the above-described methods and components. Each such computer-program may comprise sets of instructions (codes) embodied on a computer-readable medium that directs the processor of a computer system to cause corresponding actions. The instructions may be configured to run in sequential order, or in parallel (such as under different processing threads), or in a combination thereof. Special-purpose computer systems disclosed herein include a computer-program product(s) stored in tangible computer-readable memory that directs the systems to perform the above-described methods. The systems include one or more processors that communicate with a number of peripheral devices via a bus subsystem. These peripheral devices may include user output device(s), user input device(s), communications interface(s), and a storage subsystem, such as random access memory (RAM) and non-volatile storage drive (e.g., disk drive, optical drive, solid state drive), which are forms of tangible computer-readable memory.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The terms "computer-readable medium," "computer-readable media," "processor-readable medium," "processor-readable media," "machine-readable medium," and "machine-readable media," include, but are not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system to facilitate adaptive resource capacity prediction and control using cloud infrastructures with a capacity prediction interface, the system comprising:
   one or more processing devices comprising one or more processors and memory communicatively coupled with and readable by the one or more processors, the memory comprising processor-readable instructions which, when executed by the one or more processors, cause the system to perform operations comprising:
   collecting specifications of resource allocations for a plurality of resources provided by a cloud infrastructure system;
   based at least in part on the specifications of the resource allocations, collecting observation data, wherein the observation data comprises resource metrics data mapped to the plurality of resources;
   selecting prediction rules from a plurality of prediction rules as a function of one or more particular resource metrics;
   identifying a subset of the plurality of resources based at least in part on the observation data;
   using the selected prediction rules to predict resource capacities for the subset of the plurality of resources as a function of the one or more particular resource metrics and generate resource capacity predictions;
   identifying one or more incidents based at least in part on the resource capacity predictions;
   selecting a subset of the resource capacity predictions based at least in part on determining which of the resource capacity predictions satisfy one or more prediction thresholds; and
   generating a capacity prediction interface configured to represent at least the subset of the resource capacity predictions and facilitate one or more preemptive actions with respect to the one or more incidents identified based at least in part on the resource capacity predictions.

2. The system to facilitate adaptive resource capacity prediction and control using cloud infrastructures with a capacity prediction interface as recited in claim 1, the operations further comprising determining the one or more prediction thresholds as a function of type of resource and/or type of metric.

3. The system to facilitate adaptive resource capacity prediction and control using cloud infrastructures with a capacity prediction interface as recited in claim 1, wherein the capacity prediction interface comprises a capacity dashboard that graphically indicates which resource capacity predictions of the subset of the resource capacity predictions are predicted to reach exhaustion in an upcoming time window.

4. The system to facilitate adaptive resource capacity prediction and control using cloud infrastructures with a capacity prediction interface as recited in claim 3, wherein the capacity dashboard comprises one or more user-selectable interface elements to reveal which resource capacity predictions of the subset of the resource capacity predictions are predicted to reach exhaustion in a second upcoming time window that is later than the upcoming time window.

5. The system to facilitate adaptive resource capacity prediction and control using cloud infrastructures with a capacity prediction interface as recited in claim 3, wherein the capacity dashboard graphically indicates mappings of the subset of resource capacity predictions to hosts, applications, statuses, and indicia of issues as a function of various resource types.

6. The system to facilitate adaptive resource capacity prediction and control using cloud infrastructures with a capacity prediction interface as recited in claim 3, wherein the capacity dashboard comprises one or more user-selectable interface elements to reveal the subset of the resource capacity predictions as a function of type of resource.

7. The system to facilitate adaptive resource capacity prediction and control using cloud infrastructures with a capacity prediction interface as recited in claim 3, wherein the capacity dashboard comprises one or more user-selectable interface elements for each incident of the one or more incidents to reveal one or more visualizations particularized to the incident.

8. One or more non-transitory, machine-readable media having machine-readable instructions thereon which, when executed by one or more processing devices, cause a system to perform operations comprising:
   collecting specifications of resource allocations for a plurality of resources provided by a cloud infrastructure system;
   based at least in part on the specifications of the resource allocations, collecting observation data, wherein the observation data comprises resource metrics data mapped to the plurality of resources;

selecting prediction rules from a plurality of prediction rules as a function of one or more particular resource metrics;

identifying a subset of the plurality of resources based at least in part on the observation data;

using the selected prediction rules to predict resource capacities for the subset of the plurality of resources as a function of the one or more particular resource metrics and generate resource capacity predictions;

identifying one or more incidents based at least in part on the resource capacity predictions;

selecting a subset of the resource capacity predictions based at least in part on determining which of the resource capacity predictions satisfy one or more prediction thresholds; and generating a capacity prediction interface configured to represent at least the subset of the resource capacity predictions and facilitate one or more preemptive actions with respect to the one or more incidents identified based at least in part on the resource capacity predictions.

9. The one or more non-transitory, machine-readable media as recited in claim 8, the operations further comprising determining the one or more prediction thresholds as a function of type of resource and/or type of metric.

10. The one or more non-transitory, machine-readable media as recited in claim 8, wherein the capacity prediction interface comprises a capacity dashboard that graphically indicates which resource capacity predictions of the subset of the resource capacity predictions are predicted to reach exhaustion in an upcoming time window.

11. The one or more non-transitory, machine-readable media as recited in claim 10, wherein the capacity dashboard comprises one or more user-selectable interface elements to reveal which resource capacity predictions of the subset of the resource capacity predictions are predicted to reach exhaustion in a second upcoming time window that is later than the upcoming time window.

12. The one or more non-transitory, machine-readable media as recited in claim 10, wherein the capacity dashboard graphically indicates mappings of the subset of resource capacity predictions to hosts, applications, statuses, and indicia of issues as a function of various resource types.

13. The one or more non-transitory, machine-readable media as recited in claim 10, wherein the capacity dashboard comprises one or more user-selectable interface elements to reveal the subset of the resource capacity predictions as a function of type of resource.

14. The one or more non-transitory, machine-readable media as recited in claim 10, wherein the capacity dashboard comprises one or more user-selectable interface elements for each incident of the one or more incidents to reveal one or more visualizations particularized to the incident.

15. A method to facilitate adaptive resource capacity prediction and control using cloud infrastructures with a capacity prediction interface, the method comprising:

collecting specifications of resource allocations for a plurality of resources provided by a cloud infrastructure system;

based at least in part on the specifications of the resource allocations, collecting observation data, wherein the observation data comprises resource metrics data mapped to the plurality of resources;

selecting prediction rules from a plurality of prediction rules as a function of one or more particular resource metrics;

identifying a subset of the plurality of resources based at least in part on the observation data;

using the selected prediction rules to predict resource capacities for the subset of the plurality of resources as a function of the one or more particular resource metrics and generate resource capacity predictions;

identifying one or more incidents based at least in part on the resource capacity predictions;

selecting a subset of the resource capacity predictions based at least in part on determining which of the resource capacity predictions satisfy one or more prediction thresholds; and generating a capacity prediction interface configured to represent at least the subset of the resource capacity predictions and facilitate one or more preemptive actions with respect to the one or more incidents identified based at least in part on the resource capacity predictions.

16. The method to facilitate adaptive resource capacity prediction and control using cloud infrastructures with a capacity prediction interface as recited in claim 15, further comprising determining the one or more prediction thresholds as a function of type of resource and/or type of metric.

17. The method to facilitate adaptive resource capacity prediction and control using cloud infrastructures with a capacity prediction interface as recited in claim 15, wherein the capacity prediction interface comprises a capacity dashboard that graphically indicates which resource capacity predictions of the subset of the resource capacity predictions are predicted to reach exhaustion in an upcoming time window.

18. The method to facilitate adaptive resource capacity prediction and control using cloud infrastructures media with a capacity prediction interface as recited in claim 17, wherein the capacity dashboard comprises one or more user-selectable interface elements to reveal which resource capacity predictions of the subset of the resource capacity predictions are predicted to reach exhaustion in a second upcoming time window that is later than the upcoming time window.

19. The method to facilitate adaptive resource capacity prediction and control using cloud infrastructures with a capacity prediction interface as recited in claim 17, wherein the capacity dashboard graphically indicates mappings of the subset of resource capacity predictions to hosts, applications, statuses, and indicia of issues as a function of various resource types.

20. The method to facilitate adaptive resource capacity prediction and control using cloud infrastructures with a capacity prediction interface as recited in claim 17, wherein the capacity dashboard comprises one or more user-selectable interface elements to reveal the subset of the resource capacity predictions as a function of type of resource.

* * * * *